(12) United States Patent
Letkeman

(10) Patent No.: US 11,899,833 B2
(45) Date of Patent: Feb. 13, 2024

(54) SYSTEMS AND METHODS FOR INTERACTING WITH AUGMENTED REALITY CONTENT USING A DUAL-INTERFACE

(71) Applicant: SHOPIFY INC., Ottawa (CA)

(72) Inventor: Brennan Letkeman, Calgary (CA)

(73) Assignee: SHOPIFY INC.

( * ) Notice: Subject to any disclaimer, the term of this patent is extended or adjusted under 35 U.S.C. 154(b) by 0 days.

(21) Appl. No.: 17/739,714

(22) Filed: May 9, 2022

(65) Prior Publication Data
US 2023/0359268 A1    Nov. 9, 2023

(51) Int. Cl.
*G06F 3/04815* (2022.01)
*G06F 3/01* (2006.01)
*G06F 3/0488* (2022.01)
*G06F 3/04845* (2022.01)

(52) U.S. Cl.
CPC .............. *G06F 3/011* (2013.01); *G06F 3/017* (2013.01); *G06F 3/0488* (2013.01); *G06F 3/04815* (2013.01); *G06F 3/04845* (2013.01)

(58) Field of Classification Search
CPC ...... G06F 3/011; G06F 3/017; G06F 3/04815; G06F 3/04845; G06F 3/0488
See application file for complete search history.

(56) References Cited

U.S. PATENT DOCUMENTS

| | | | |
|---|---|---|---|
| 9,310,883 B2* | 4/2016 | Weising | A63F 13/00 |
| 10,424,077 B2* | 9/2019 | Weising | A63F 3/02 |
| 11,145,135 B1* | 10/2021 | Ng | G06F 3/04817 |
| 11,710,310 B2* | 7/2023 | Grundhoefer | G06F 3/011 |
| | | | 345/633 |
| 2013/0050131 A1* | 2/2013 | Lee | G08G 1/09626 |
| | | | 345/174 |

(Continued)

FOREIGN PATENT DOCUMENTS

KR    10-2014-0146889 A    12/2014

OTHER PUBLICATIONS

Zimmer et al. "Effectiveness of a smartphone-based, augmented reality exposure app to reduce fear of spiders in real-life: A randomized controlled trial". Journal of Anxiety Disorders 82 (2021) 102424. Jul. 2, 2021. 8 pages.

(Continued)

*Primary Examiner* — Gene W Lee

(57) ABSTRACT

To interact with and manipulate a virtual object associated with an AR experience displayed on the screen of a user device (e.g., a smartphone), the user must first learn or discover the particular gestures that correspond with a given function, but such gestures may not always be intuitive. The user may find it difficult or bothersome to learn/remember the specific gesture(s) needed to achieve a specific result. Moreover, there are only a limited number of gestures that can be performed using the screen of the device, often leading to gestural conflict. In some embodiments, a dual-interface AR system may be implemented to provide an AR experience for a user. The dual-interface AR system utilizes two user interfaces and distributes the input gestures between them, allowing the user to dynamically switch between the two and to use the interface that may be most intuitive to the user.

21 Claims, 17 Drawing Sheets

(56) References Cited

U.S. PATENT DOCUMENTS

2013/0307875 A1* 11/2013 Anderson ............. A63F 13/213
  345/633
2019/0384405 A1* 12/2019 Lyer .................... G06V 40/113
2023/0343049 A1* 10/2023 Boesel ................. G06F 3/0484

OTHER PUBLICATIONS

"Augmented reality". Wikipedia. Available on the Internet Apr. 6, 2021. Retrieved from https://web.archive.org/web/20210412191226/https://en.wikipedia.org/wiki/Augmented_reality on Mar. 8, 2023. 50 pages.

Aphoniko. "SnapShop—Finding, Visualizing and Sharing Furniture from your iPhone". YouTube. Video. May 17, 2010. Retrieved from https://www.youtube.com/watch?v=62fLkCZLnm0. 9 pages of screenshots.

Future Business Tech. "The Future of Augmented Reality: 10 Awesome Use Cases". YouTube. Video. Sep. 21, 2021. Retrieved from https://www.youtube.com/watch?v=WxzcD04rwc8. 5 pages of screenshots.

* cited by examiner

E-Commerce Platform | Search | JG John's Apparel / Jonny B. Good

- Home
- Orders
- Products
- Customers
- Reports
- Discounts
- Apps

SALES CHANNELS
- Online Store
- Mobile App

View all channels

Settings

Good afternoon, Jonny B..

Here's what's happening with your store today.

Today's total sales   Today's visits
$98.00                1

- Update your Platform Payments tax details
  We require additional information to verify your identity.
  [Update tax details]

- Advanced Cash on Delivery has been deactivated for your store
  [See why]

All channels ⌄        Today ⌄

TOTAL SALES
$98.00

$125
$75
$25

12am    8pm    4pm    11pm
              Jun 1
              2 orders

TOTAL SALES BY CHANNEL    View dashboard    Jun 1

Online Store
$0.00                                            0 orders

Mobile app
$0.00                                            0 orders

Shopify POS (126 York St.)
$0.00                                            0 orders

FIG. 15

SYSTEMS AND METHODS FOR INTERACTING WITH AUGMENTED REALITY CONTENT USING A DUAL-INTERFACE

FIELD

The present application relates to augmented reality (AR), and in particular embodiments, to user interaction with AR content.

BACKGROUND

AR relates to the enhancement of real-world experiences using computer-generated or virtual content. In some cases, AR involves superimposing virtual content over physical real-world content. This superposition can be either constructive or destructive. Constructive AR adds content to a real-world experience, whereas destructive AR masks content in a real-world experience. AR differs from virtual reality (VR). VR relates to the creation of a completely virtual experience, whereas AR maintains at least a portion of the real-world experience, but alters the perception of that real-world experience using virtual content.

SUMMARY

Systems that create AR experiences on the screen of a user's device face various technical challenges.

A user may find it difficult to interact with and manipulate a virtual object using only a touch-based control on their device, e.g. using only a touch screen that the user needs to interact with to manipulate a virtual object by touching their device screen. For example, there are only a limited number of gestures that can be performed on a device screen by a user. This can lead to gestural conflict, where the user's gesture is misinterpreted by the system as a different gesture. Such gestural conflicts may leave the user feeling frustrated and reduce their desire to continue using the AR system. Further, the gesture that a user must perform to bring about a specific function may not be intuitive to the user. The user may therefore find it difficult or bothersome to learn, perform, and/or remember the specific gesture (or series of gestures) needed to achieve a specific result.

There are also machine-human user interface technical challenges associated with AR systems that use devices not having a touch screen or other touch-based control. Such systems may respond to gestures that a user performs in a real-world space. For example, a user may use various hand gestures to select, interact with, and manipulate a virtual model of an object shown on a device screen, such as on a headset display. Being accustomed to using touch screens or other touch-based controls, a user may be unwilling, or find it difficult, to learn to use an AR system where all functions must be brought about by gestures performed in the real-word space. Further, similar to the issue discussed above with respect to AR applications which use touch-based controls, the user may have to perform complex gestures corresponding to specific functions, and the gestures may lead to gestural conflicts.

In some embodiments, a dual-interface AR system may be implemented to provide an AR experience for a user. A user's device may first be used to overlay AR content, such as a virtual object, onto a view of the user's real-world space displayed by the device. The user may use functionalities provided by the device, such as a touch-based control, to alter the depiction of the virtual model in various ways. For example, the touch-based control may include a first sensor, like a touch screen, which the user may use to view the virtual object in a different material, design, or color, or to select a different virtual object to be included in the AR content and displayed by the device.

When the user wants to manipulate (e.g., scale, rotate, or move) the virtual model, the AR system may allow for the user to interact with the virtual model using gestures performed in the real-world space. In some embodiments, using a second sensor of the device, such as an imaging sensor, the user's hand may be detected and depicted in the AR environment shown on the device. At the time the user's hand is detected, the AR environment displayed by the device may be altered to indicate that the detection has occurred.

The user may then use hand gestures in order to manipulate the virtual model. These hand gestures may be detected by the imaging sensor. For example, the user may make a physical rotating gesture using their hand to rotate the virtual model. These types of physical hand gestures may be much more intuitive and easy for the user, as they may generally mimic the types of gestures the user may make when rotating or moving a real-life object. Further, no longer being limited to touch-based controls on the device, e.g. on the 2D device screen, there may be more freedom in terms of the gestures the AR system can support.

Thus, the dual-interface AR system of some embodiments may address the technical challenges described above in relation to current AR systems which utilize a single user interface. The dual-interface AR system of some embodiments does not limit the user interface to only a touch-based control (e.g. a touch screen) or to only gestures (e.g. hand gestures) captured by a camera, but instead distributes input gestures between the two user interfaces, allowing the user to dynamically switch between the two and to use the interface that may be most intuitive to the user in a given circumstance, or for a given operation.

In some embodiments, there is provided a computer-implemented method. The method may include a step of receiving an input corresponding to interaction with a touch-based control of a device. The input may define an operation for AR content that is overlaid onto a view of a real-world space and displayed by the device. The method may further include, subsequent to receiving the input corresponding to the interaction with the touch-based control of the device, detecting a gesture performed in the real-world space depicted in the view. The method may further include, responsive to detecting the gesture, manipulating the AR content.

In some embodiments, the touch-based control may include a first sensor of the device, and the device may further include a second sensor different from the first sensor. The second sensor may be used for detecting the gesture performed in the real-world space depicted in the view. In some embodiments, the touch-based control may be disposed on a first side of the device and the second sensor is disposed on a second side of the device. The first side of the device may be opposite the second side of the device. In some embodiments, the touch-based control is a touch-sensitive element associated with a touch screen display of the device. In some embodiments, the second sensor may include an imaging sensor used for capturing images of the real-world space. In some embodiments, the images of the real-world space include images depicting the view of the real-world space.

In some embodiments, the gesture may be a hand gesture. In some embodiments, the method may further include a step of, prior to detecting the gesture, detecting a hand in the real-world space, and responsive to detecting the hand, altering what is output for display by the device. In some embodiments, altering what is output for display by the device may include at least one of adding, reducing, or removing a graphical user interface element displayed by the device. In some embodiments, altering what is output for display by the device may include one or both of reducing or removing the graphical user interface element displayed by the device, and the method may further include a step of, in response to no longer detecting the hand in the real-world space, further altering what is output for display by the device to restore at least some of the graphical user interface element that was reduced or removed. In some embodiments, altering what is output for display by the device may include adding the graphical user interface element to what is displayed by the device, and the method may further include a step of, in response to no longer detecting the hand in the real-world space, further altering what is output for display by the device to remove the graphical user interface element that was added.

In some embodiments, the input corresponding to interaction with the touch-based control of the device may be associated with selecting a virtual 3D model to be included in the AR content. In some embodiments, the AR content may include a virtual 3D model, and the input corresponding to interaction with the touch-based control of the device may be associated with modifying at least one of a color, design, or material of the virtual 3D model. In some embodiments, the AR content may include a virtual 3D model, and manipulating the AR content displayed on the screen of the user device may include at least one of rotating, modifying the dimensions of, or modifying the location of the virtual 3D model.

A system is also disclosed that is configured to perform the methods disclosed herein. For example, the system may include at least one processor to directly perform (or instruct the system to perform) the method steps.

In another embodiment, there is provided a computer readable medium having stored thereon computer-executable instructions that, when executed by a computer, cause the computer to perform operations of the methods disclosed herein. The computer readable medium may be non-transitory.

BRIEF DESCRIPTION OF THE DRAWINGS

Embodiments will be described, by way of example only, with reference to the accompanying figures wherein:

FIG. 15 is an example of a home page of an administrator, according to some embodiments.

DETAILED DESCRIPTION

Figure 1:
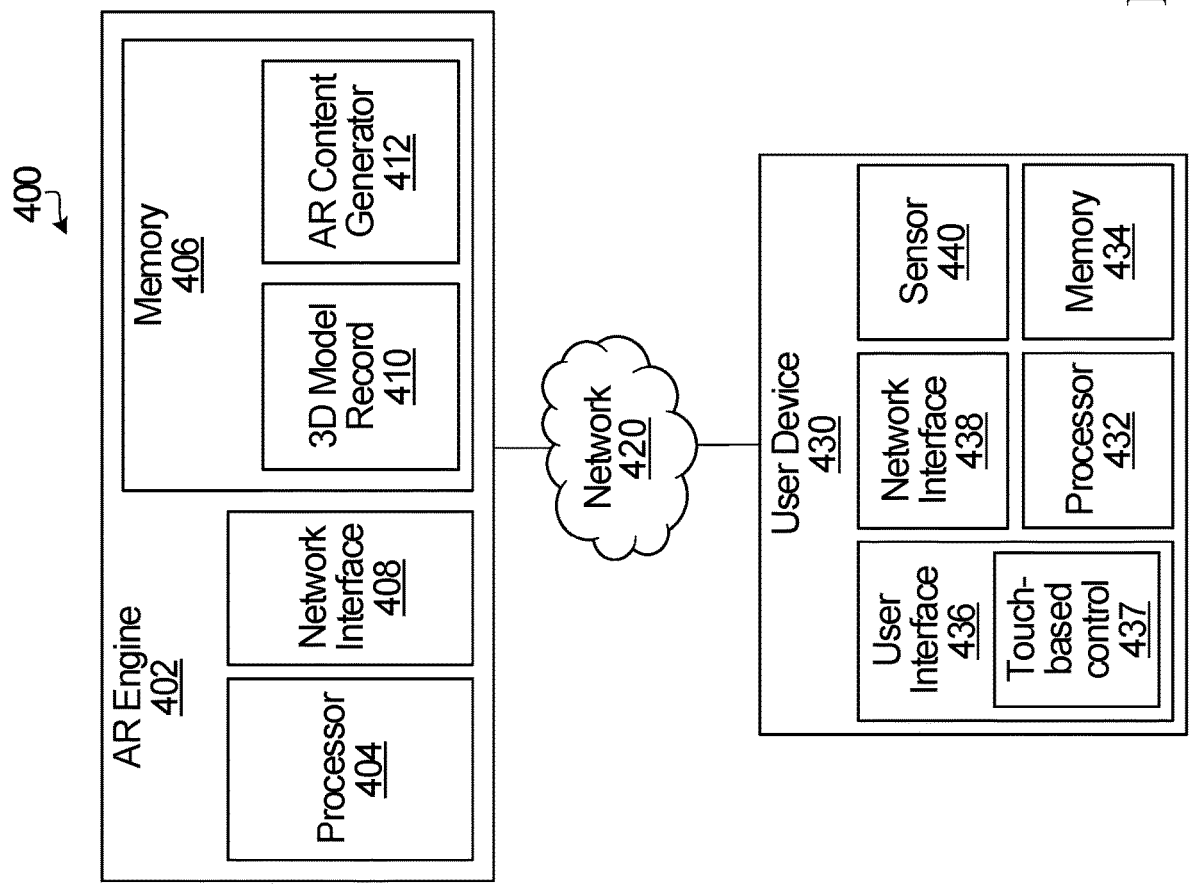
FIG. 1 is a block diagram illustrating a system for providing dual-interface interactable AR content, according to some embodiments.

For illustrative purposes, specific embodiments will now be explained in greater detail below in conjunction with the figures.

AR is becoming more prevalent as the technology behind it becomes more sophisticated and affordable. AR applications may be applied to many different industries, and can enhance and enrich a user's experience. For example, a user's mobile device such as a phone or a tablet may be used to overlay a virtual model of an object onto a representation of the user's real-world environment, so that it appears as if the virtual model is actually in the real-world environment within the display screen of the device. The user may use functionalities provided on the display screen, which may be a touch screen, to alter the depiction of the virtual model in various ways.

Systems that create AR experiences on the screen of a user's device face various technical challenges.

A user may find it difficult to interact with and manipulate a virtual object using only a touch-based control on their device, e.g. using only a touch screen that the user needs to interact with to manipulate a virtual object by touching their device screen. For example, a user may wish to rotate a virtual model of an object to view the object from a different perspective. A rotation function may be supported by the AR system. However, in order to rotate the object, the user must first learn or discover the particular gesture that corresponds with the function. This gesture may not be intuitive to the user. For example, the user may have to first select a particular space on the screen to be able to view various arrows pointing in different directions, and then press on one or more of the arrows to rotate the virtual object to a desired orientation. The user may therefore find it difficult or bothersome to learn, perform, and/or remember the specific gesture(s) needed to achieve a specific result.

Moreover, there are only a limited number of commonly used gestures (e.g. swiping, tapping, dragging) that can be performed using the screen of a device. This may cause or exacerbate the problem of "gestural conflict", where a user can no longer reasonably expect a gesture to perform a definite function (e.g. because the gesture corresponds to two or more possible functions based on what the user can see on the screen of the device). For example, a user using an AR system may use a swiping gesture to view different virtual models of products of a product catalog. The user may select a product of interest, e.g. a couch, and the AR system may display a virtual model of the couch in the AR environment displayed by the device. Wanting to move the virtual couch to the right, the user may make a swiping gesture to the right. In some cases, this swiping gesture may be mistakenly interpreted as the user wanting to view a different virtual model corresponding to a different product, and instead of the virtual couch being moved to the right, the virtual couch is replaced by a virtual model of a different product in the AR environment. In other cases, the swiping gesture may be correctly understood such that the virtual couch is moved to the right, but when the user subsequently desires to view a virtual model of a different product, the swiping gesture may continually be registered as the user wanting to move the virtual couch to the right and the AR system may fail to display a virtual model of the different product. Such gestural conflicts may leave the user feeling frustrated and reduce their desire to continue using the AR system.

AR applications in which a touch screen is not used, e.g. an AR headset or AR glasses, do not have the challenges associated with touch screens mentioned above. However, they suffer from other machine-human user interface technical challenges.

AR applications which use an AR headset or AR glasses may respond to hand gestures that a user performs in the real-world space. For example, a user may use various hand gestures which are detected and recognized by a sensor on the AR headset or glasses, to select a virtual model of an object to be displayed within the real-world space as shown on the headset or glasses display.

Being accustomed to using controls provided by a mobile device (e.g. a touch screen, keyboard, etc.), a user may be unwilling, or find it difficult, to learn to use an AR system where all functions must be brought about by hand gestures. Further, similar to the issue discussed above with respect to AR applications which use a touch screen, the user may have to learn or discover a complex series of gestures corresponding to specific functions.

For example, in order to select a virtual model of a product to be displayed, a user may have to perform a first hand gesture to summon a catalogue of possible virtual models which can be overlaid in the AR environment, a second hand gesture to browse through the catalogue, and a third hand gesture to select a virtual model of interest. Various other hand gestures may have to be carried out to alter the design, color, or material of the virtual model. One or more of these gestures may conflict with each other, or conflict with other gestures that are used to manipulate (e.g., rotate or move) a selected virtual model, again leading to user frustration and reduced user uptake. In order to avoid such gestural conflicts, the AR system may require the user to learn complex and non-intuitive gestures to realize certain functions.

Additionally, features required to display the desired AR content, such as a menu, carousel, or slider (e.g., for viewing a virtual product catalogue or for viewing different designs, colors, and materials available for a virtual model) may occlude a user's view of a selected virtual model and/or the real-world space around the model, which may affect the user's level of immersion and negatively affect the user's overall AR experience.

In some embodiments, a dual-interface AR system may be implemented to provide an AR experience for a user. A user's mobile device may first be used to overlay a virtual model of a product onto a representation of the user's real-world space shown on the mobile device. The user may use functionalities provided on the display screen, which may be a touch screen, to alter the depiction of the virtual model in various ways. For example, the user may interact with a slider provided on the screen to view the virtual model in a different material, design, or color, or use a swiping gesture to view a virtual model of a different product. In this way, the AR system may provide the user with a first user interface (i.e., a touch-based control on the user device, such as the two-dimensional touch screen of the mobile device) with which the user can interact with the virtual model.

When the user wants to manipulate (e.g., scale, rotate, or move) the virtual model, the AR system may allow for the user to interact with the virtual model via visually simulated physical contact with the object. The user may be prompted to, or may intuitively, reach their hand towards where the virtual model appears to be in the real-world space. The user's hand may be detected and tracked using a sensor of the mobile device, such as a rear-facing camera, such that the hand is depicted in the AR environment as shown on the mobile device screen. At the time of detection of the user's hand and/or at the time of visually simulated contact between the virtual model and the user's hand, the user may be provided with a visual, audio, or haptic feedback.

In some embodiments, once visually simulated contact has been established between the user's hand and the virtual model, the user may use hand gestures in order to manipulate the virtual model. For example, the user may make a physical rotating gesture using their hand (e.g. using one or more fingers) to rotate the virtual model. To move the virtual model to another location within the AR environment, the user may make a physical pointing, pushing, flicking, etc. gesture using their hand.

These types of physical hand gestures may be much more intuitive and easy for the user, as they may generally mimic the types of gestures the user may make when rotating or moving a real-life object. Further, no longer being limited to touch-based controls (e.g. on the 2D mobile device screen), there is more freedom in terms of the gestures the AR system can support. In this way, the AR system may provide the user with a second user interface (i.e. the real-world space as captured by the camera of the user device) with which the user can interact with the virtual model.

Thus, the dual-interface AR system may address the technical challenges described above in relation to current AR systems which utilize a single user interface. The dual-interface AR system of some embodiments does not limit the user interface to only a touch screen or only hand gestures captured by a camera. Instead, the system utilizes both user interfaces and distributes the input gestures between the two, allowing the user to dynamically switch between the two and to use the interface that may be most intuitive to the user in a given circumstance or for a given operation.

Although the examples described herein are primarily in the context of e-commerce, the methods and systems are not limited to e-commerce, and may apply to any scenario in which a user is interacting with AR content.

FIG. 1 is a block diagram illustrating an example AR system 400 for providing dual-interface interactable AR content. The system 400 includes an AR engine 402, a network 420, and a user device 430.

The network 420 may be a computer network implementing wired and/or wireless connections between different devices, including the AR engine 402 and the user device 430. The network 420 may implement any communication protocol known in the art. Non-limiting examples of network 420 include a local area network (LAN), a wireless LAN, an internet protocol (IP) network, and a cellular network.

The AR engine 402 supports the generation of dual-interface interactable AR content. As illustrated, the AR engine 402 includes a processor 404, a memory 406, and a network interface 408.

The processor 404 may be implemented by one or more processors that execute instructions stored in the memory 406 or in another non-transitory computer readable medium. Alternatively, some or all of the processor 404 may be implemented using dedicated circuitry, such as an application specific integrated circuit (ASIC), a graphics processing unit (GPU) or a programmed field programmable gate array (FPGA).

The memory 406 includes a three-dimensional (3D) model record 410 and an AR content generator 412. The memory 406 may store instructions related to the 3D model record 410 and the AR content generator 412 that are executed by the processor 404 of AR engine 402. For example, the AR content generator 412 may store instructions and algorithms for creating an AR content for display by a user device, and memory 406 may store other instructions related to implementing an AR experience, such as manipulating a virtual 3D model included in AR content. These instructions may be executed by processor 404.

The network interface 408 is provided for communication over the network 420. The structure of the network interface 408 is implementation specific. For example, the network interface 408 may include a network interface card (NIC), a computer port (e.g., a physical outlet to which a plug or cable connects), and/or a network socket.

The 3D model record 410 stores virtual 3D models of objects, such as items, buildings, locations, scenery, persons, anatomical features, and animals. These virtual 3D models can be implemented in an AR experience. By way of example, a user may be provided with an AR experience by searching for and selecting virtual 3D models stored in the 3D model record 410. The virtual 3D models can then be implemented within the AR experience for the user, allowing the user to view and optionally interact with the virtual 3D models.

A 3D model is a specification of one or more virtual objects renderable, as specified, as AR content. A 3D model can be positioned or otherwise defined within a 3D virtual coordinate system, e.g. within a virtual coordinate system generated via simultaneous localization and mapping (SLAM) technology. The virtual coordinate system may be a cartesian coordinate system, a cylindrical coordinate system or a polar coordinate system, for example. A 3D model may be entirely computer-generated or may be generated based on measurements of a real-world entity. Possible methods for generating 3D models from a real-world entity include photogrammetry (creating a 3D model from a series of 2D images), and 3D scanning (moving a scanner around the object to capture all angles). Other methods of generating 3D models are possible.

A 3D model of an object allows for the object to be viewed at various different angles in an AR experience. For example, a user may be able to view various different angles of the object by moving their position in relation to the 3D model. Alternatively, the user may be able to view various different angles of the object by interacting with and moving the 3D model to show different angles.

A model stored in the 3D model record 410 can also have associated audio content and/or haptic content. For example, the 3D model record 410 could store sounds made by or otherwise associated with a model and/or haptic feedback associated with the model.

The virtual 3D models stored in the 3D model record 410 may be obtained in various ways. In some embodiments, at least some of the models may be obtained from a user of AR engine 402. For example, in the commerce industry, a merchant may generate virtual 3D models for any of the products sold in their store. These 3D models may be provided to the AR engine 402 by the merchant, or the AR engine 402 may obtain the 3D models from a merchant's account on an e-commerce platform and/or from the merchant's online store. Virtual 3D models may also be obtained from other platforms such as social media platforms, for example. In addition, some of the virtual 3D models may be generated locally at the AR engine 402. For example, images or scans may be obtained by or provided to the AR engine 402 to generate a 3D model.

Note that although 3D models are described in the examples, in some implementations 2D models may instead be utilized. More generally, 3D model record 410 may simply be a model record, which may store models of any dimensions, such as 2D or 3D, that may be utilized in some embodiments.

The user device 430 includes a processor 432, a memory 434, user interface 436, network interface 438 and sensor 440. Although only one user device 430 is illustrated in FIG. 1 for sake of clarity, AR engine 402 may interact with other user devices, such as user device 610 shown in FIGS. 3-13.

The user interface 436 includes a touch-based control 437. Touch-based control 437 may be, for example, a touch-sensitive element, such as a touch screen, associated with a touch screen display of user device 430, a button provided on user device 430, a keyboard and/or a mouse. The user interface 436 may also include a gesture recognition system, a speaker, headphones, a microphone, and/or haptics. The user interface 436 can present virtual content to a user, including visual, haptic, and audio content.

The network interface 438 is provided for communicating over the network 420. The structure of the network interface 438 will depend on how user device 430 interfaces with the network 420. For example, if user device 430 is a mobile phone, headset or tablet, then the network interface 438 may include a transmitter/receiver with an antenna to send and receive wireless transmissions to/from the network 420. If the user device is a personal computer connected to the network with a network cable, then the network interface 438 may include, for example, a NIC, a computer port, and/or a network socket.

The sensor 440 may be provided to obtain measurements of the real-world space surrounding the user device 430. These measurements can be used to generate representations of the real-world space within which AR content, such as virtual 3D models of objects which may be stored in memory 406 of AR engine 402, can be placed. The sensor 440 may additionally capture or detect movements performed by a user in the real-world space surrounding the user device 430, such as a hand motion or gesture. The sensor 440 may include one or more cameras, and/or one or more radar sensors, and/or one or more lidar sensors, and/or one or more sonar sensors, and/or one or more gyro sensors, and/or one or more accelerometers, etc. When the sensor 440 includes a camera, images captured by the camera may be processed by the AR engine 402. Measurements obtained from other sensors of the user device 430 such as radar sensors, lidar sensors and/or sonar sensors, can also be processed by the AR engine 402. Although the sensor 440 is shown as a component of the user device 430, the sensor 440 may also or instead be implemented separately from the user device 430 and may communicate with the user device 430 and/or the AR engine 402 via wired and/or wireless connections, for example.

The processor 432 directly performs or instructs all of the operations performed by the user device 430. Examples of these operations include processing inputs received from the user interface 436 and sensor 440, preparing information for transmission over the network 420, processing data received over the network 420, and instructing a display screen to display information. The processor 432 may be implemented by one or more processors that execute instructions stored in the memory 434 or in another non-transitory computer readable medium. Alternatively, some or all of the processor 432 may be implemented using dedicated circuitry, such as an ASIC, a GPU, or a programmed FPGA.

The AR engine 402 is provided by way of example. Other implementations of an AR engine are also contemplated. In some embodiments, an AR engine may be implemented as a stand-alone service to generate AR content. In some embodiments, an AR engine may be implemented at least in part by a user device, such as a customer device or a merchant device, or a server associated with the user. For example, AR engine 402 could instead be implemented in part or in whole on the user device 430. A software application may be installed on the user device 430 that generates virtual content locally (i.e., on the user device 430). The software application may receive the 3D model record 410, the AR content generator 412 and/or any other data stored in memory 406 from the AR engine 402. In some embodiments, an AR engine may be provided at least in part by an e-commerce platform, either as a core function of the e-commerce platform or as an application or service supported by or communicating with the e-commerce platform.

Figure 2:
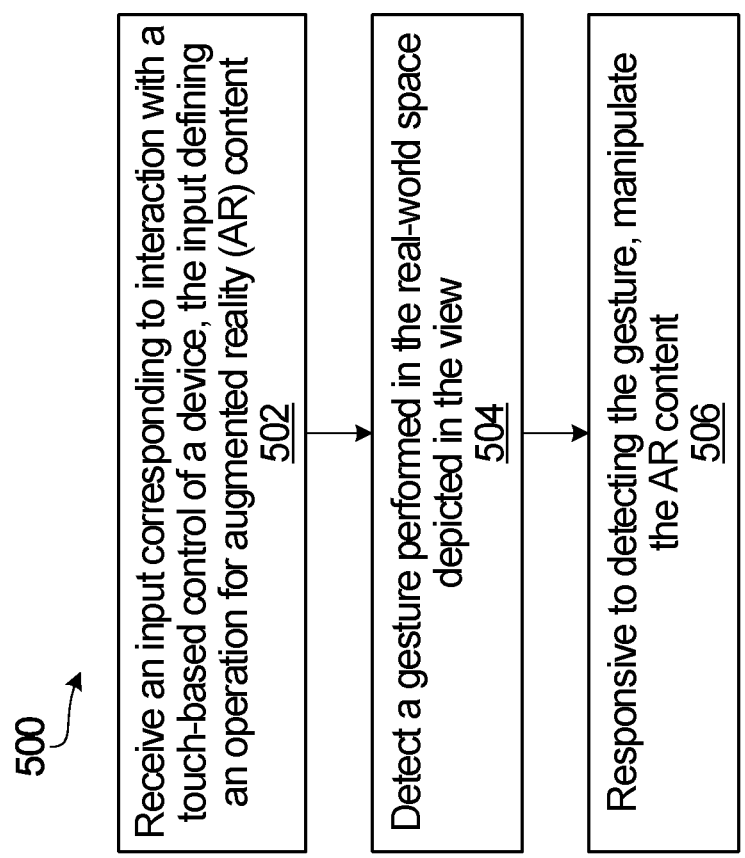
FIG. 2 illustrates a computer-implemented method, according to some embodiments.

FIG. 2 illustrates a computer-implemented method 500, according to some embodiments. The steps of method 500 are described as being performed by the processor 404 of AR engine 402 of FIG. 1, but this is only an example. At least a portion of the method 500 may instead be performed elsewhere, such as at the user device 430.

Figure 3:
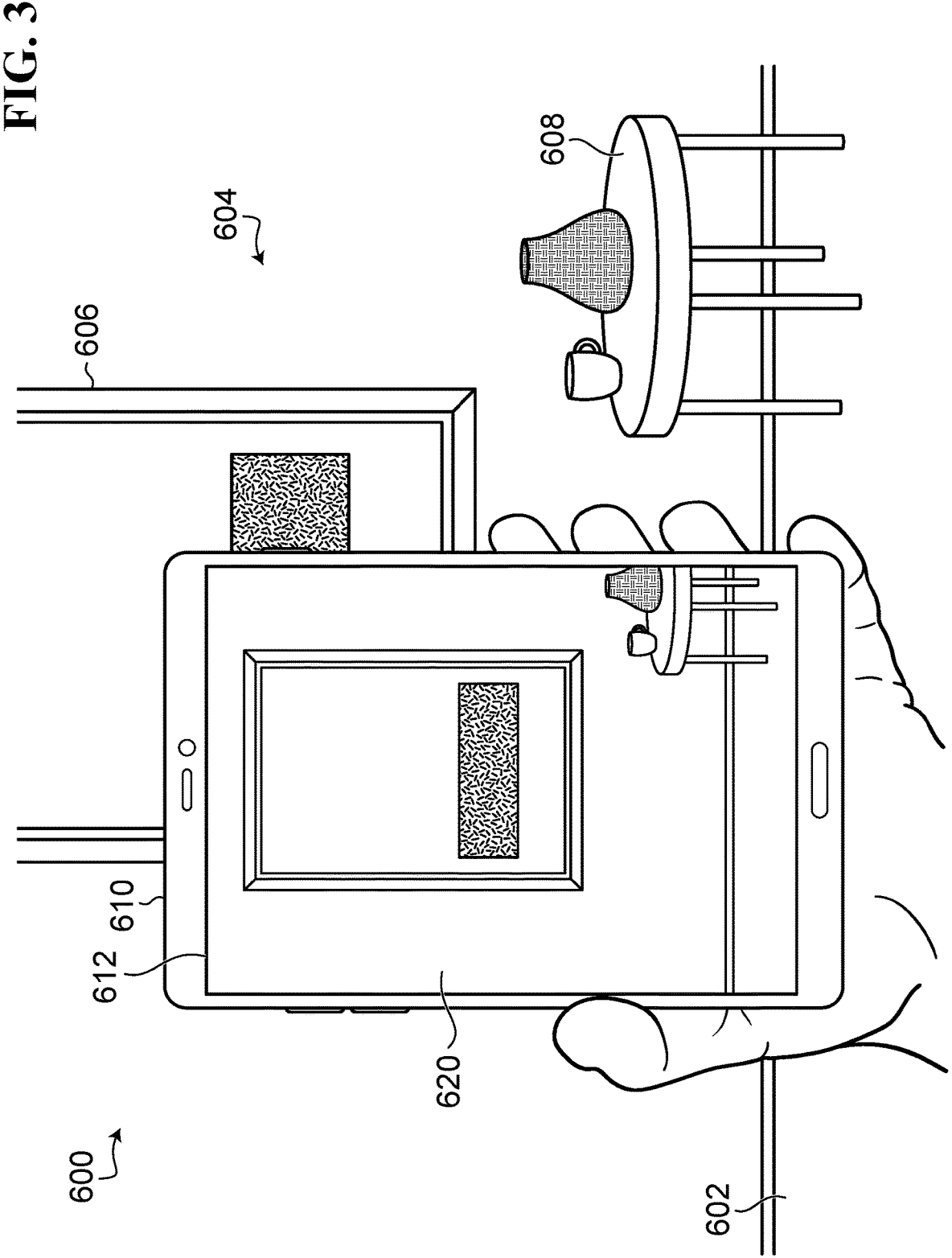
FIG. 3 illustrates a user device displaying an AR environment based on a real-world space surrounding the user device, according to some embodiments.
Figure 4:
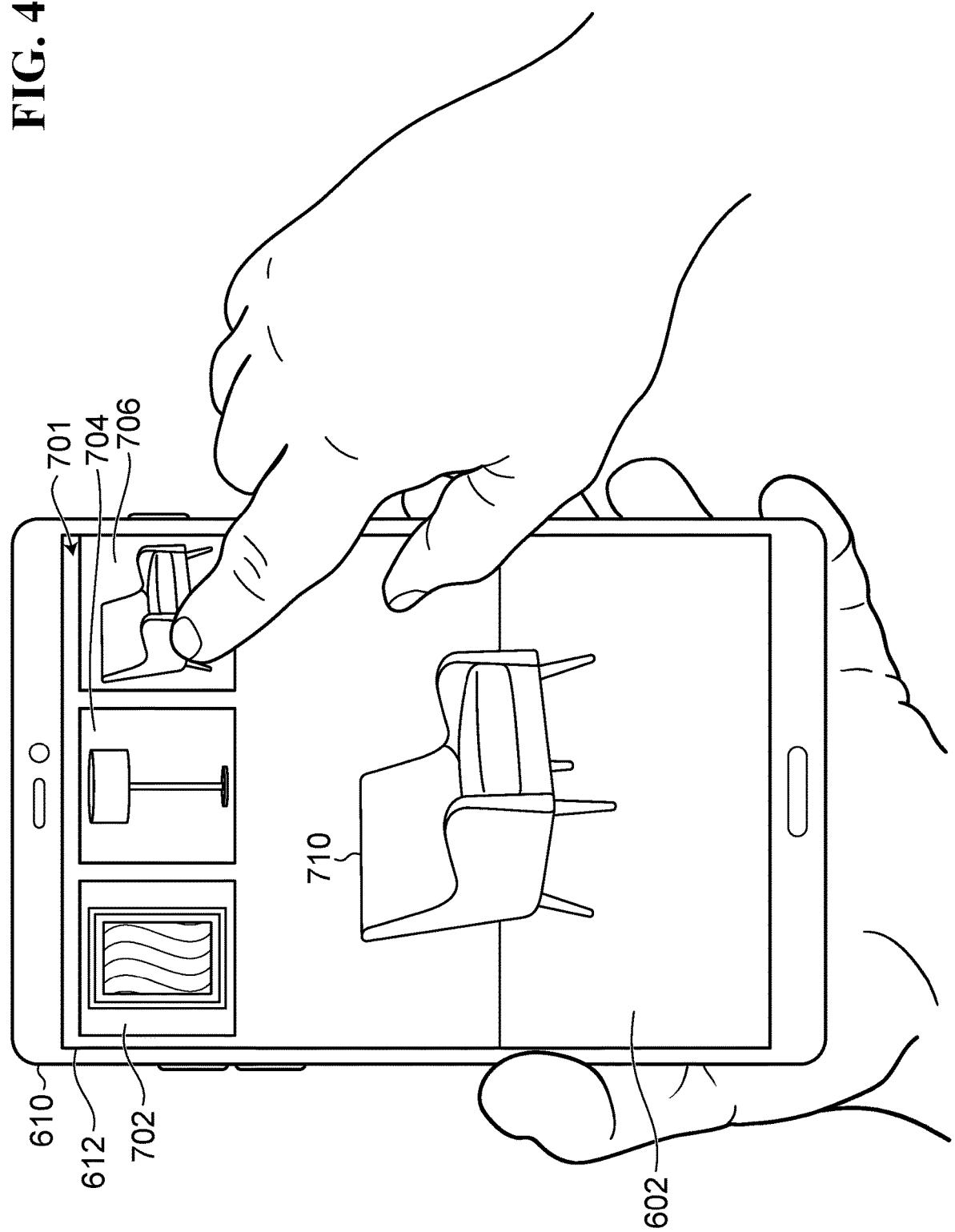
FIG. 4 illustrates the user device of FIG. 3 displaying dual-interface interactable AR content within the AR environment, according to some embodiments.

At step 502, processor 404 may receive an input corresponding to interaction with a touch-based control of a device. The device may be a user device. The input may define an operation for AR content that is overlaid onto a view of a real-world space and displayed by the device. The language "displayed by the device" may include embodiments in which the AR content that is overlaid onto a view of the real-world space is output to an output device (e.g., a display) that is integrated into, or is in communication with (e.g., in electrical communication with, or connected to), the device. For example, FIG. 3 shows a user device 610, which may be user device 430 or another user device in communication with the AR engine 402. The user device 610 includes the same components as those illustrated in user device 430 of FIG. 1. For example, user device 610 includes a touch-based control, illustrated here as a touch screen 612. The user device 610 displays, through the touch screen 612, a view of the real-world space surrounding the device 610. Processor 404 may generate AR content that is overlaid onto the view displayed by the user device 610. FIG. 4 shows a user interacting with the touch screen 612 of the user device 610. The processor 404 may receive an input corresponding to interaction with the touch display screen 612. In the embodiment depicted in FIG. 4, the input may be the user's tapping of a graphical user interface element 706 displayed on the touch screen 612. The tap may define an operation for AR content resulting in an AR object 710 being generated by processor 404 and overlaid onto the view of the real-world space displayed by user device 610. In other words, the input, which in the embodiment illustrated in FIG. 4 is the user's tapping of graphical user interface element 706, may be associated with selecting a virtual 3D model to be included in AR content that is overlaid onto the view of the real-world space displayed by user device 610.

In some embodiments, the AR content includes a virtual 3D model, such as the AR object 710 shown in FIGS. 4-13. In such embodiments, the input corresponding to interaction with the touch-based control of the device may be associated with modifying at least one of a color, design, or material of the virtual 3D model. For example, in the embodiment depicted in FIG. 5, the touch screen 612 displays a colors panel 802 and a designs panel 804. The panels 802 and 804 are provided for a user to modify the depicted color and design, respectively, of the AR object 710. A user may use motions such as tapping, scrolling, swiping, etc. to interact with the touch screen 612 in order to modify the color and design of AR object 710. Although not shown, the touch screen 612 may additionally display a materials panel which the user can use to modify the depicted material of the AR object 710.

The touch screen 612 may include a first sensor of user device 610, e.g. a touch sensor which provides the functionality of touch screen 612, and may be disposed on a first side of user device 610. User device 610 may include a second sensor different from the first sensor. The second sensor may include an imaging sensor which captures images of the real-world space. The images of the real-world space may include images depicting the view of the real-world space displayed on the touch screen 612. For example, in FIG. 3, there is a rear-facing camera (not shown) disposed on a second side of user device 610. The rear-facing camera captures images of the real-world space surrounding user device 610, these captured images including images depicting the view of the real-world space displayed on the touch screen 612 of user device 610. The rear-facing camera is an example of an imaging sensor. The touch screen 612 is located on the front side of user device 610 and the rear-facing camera is located on the opposite rear side of the user device 610.

Figure 5:
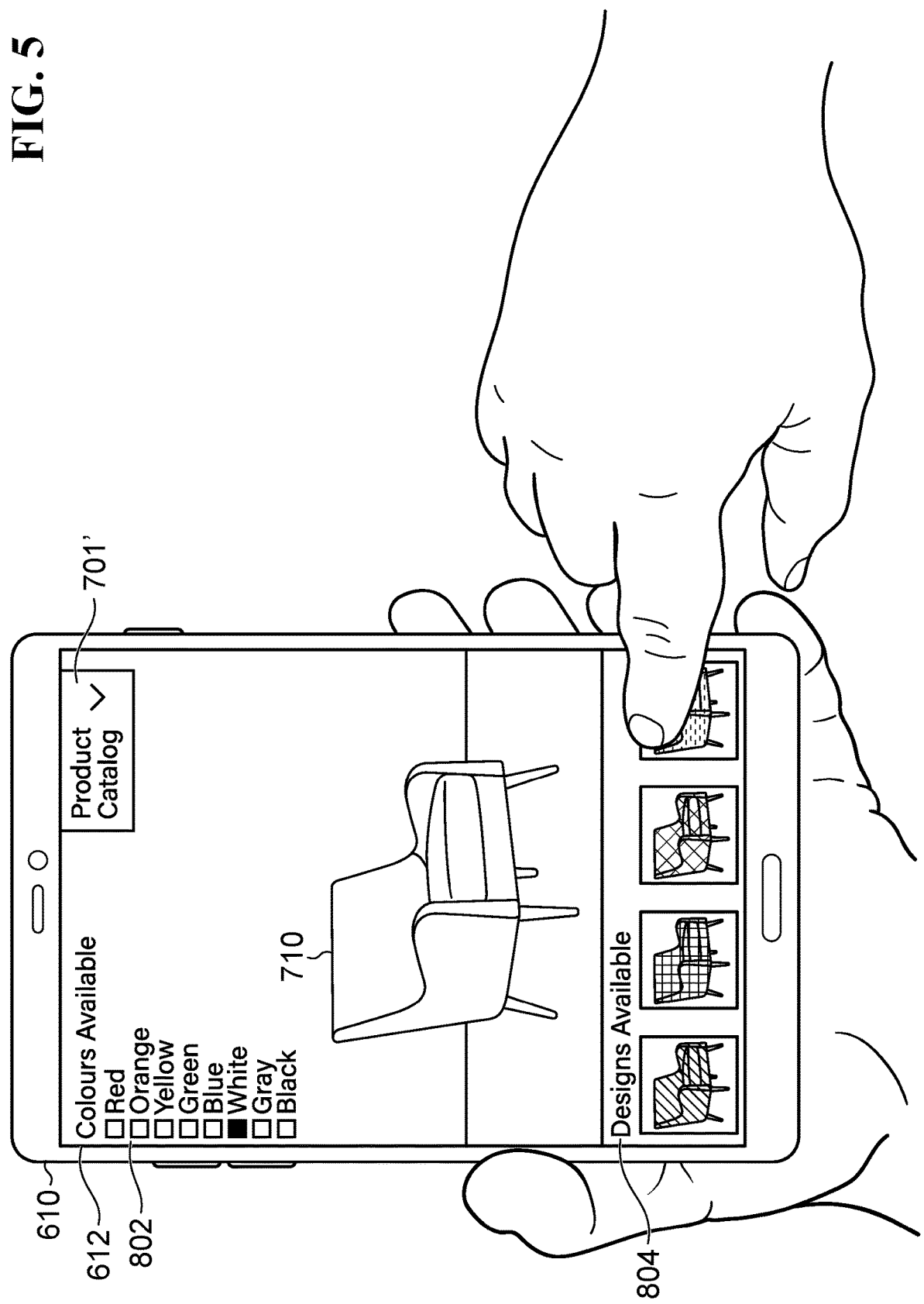
FIG. 5 illustrates a user interacting with the AR content of FIG. 4 using a first interface, according to some embodiments.
Figure 6:
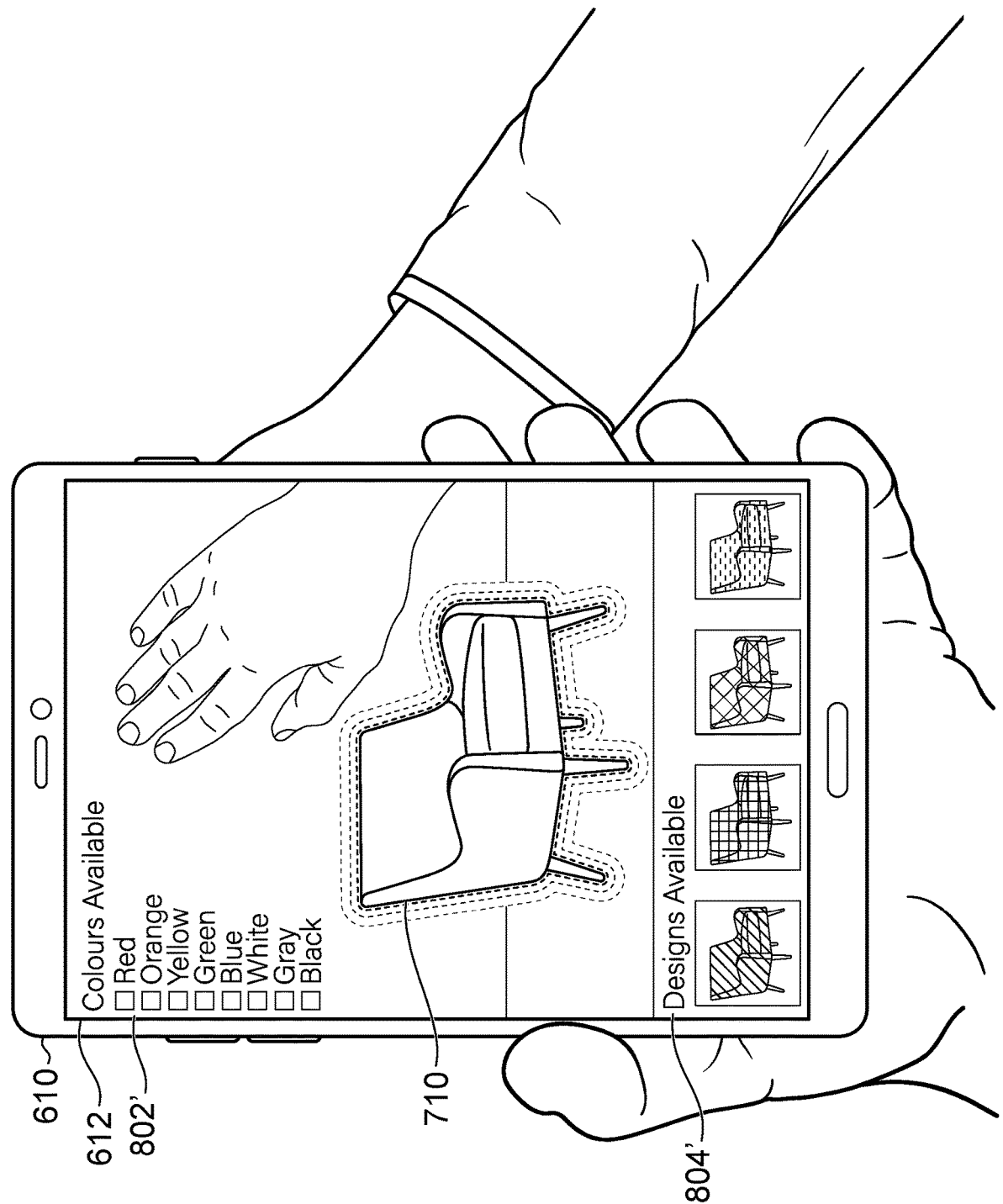
FIGS. 6-7B illustrate the user's hand being detected within the AR environment, according to some embodiments.
Figure 7A:
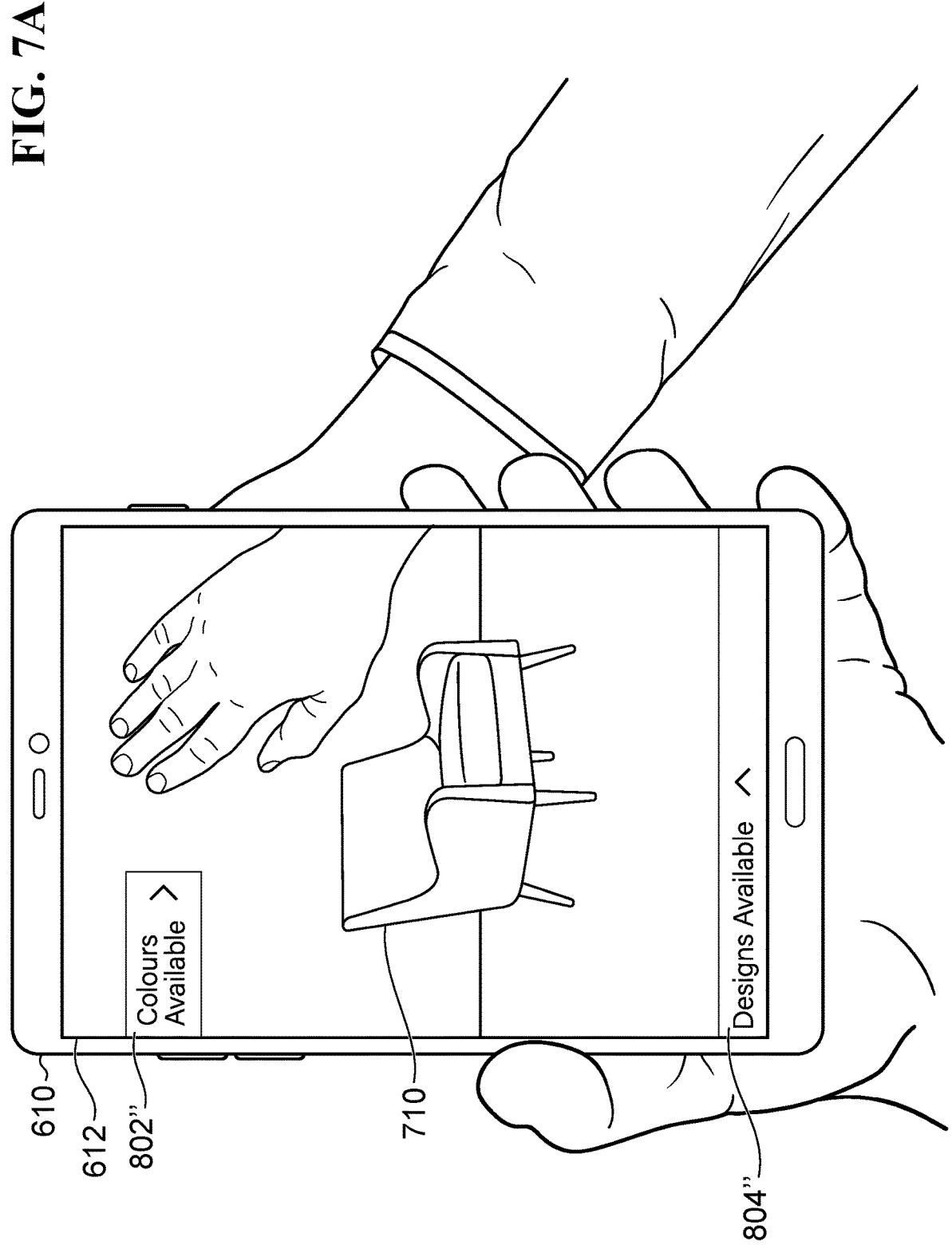
Figure 7B:
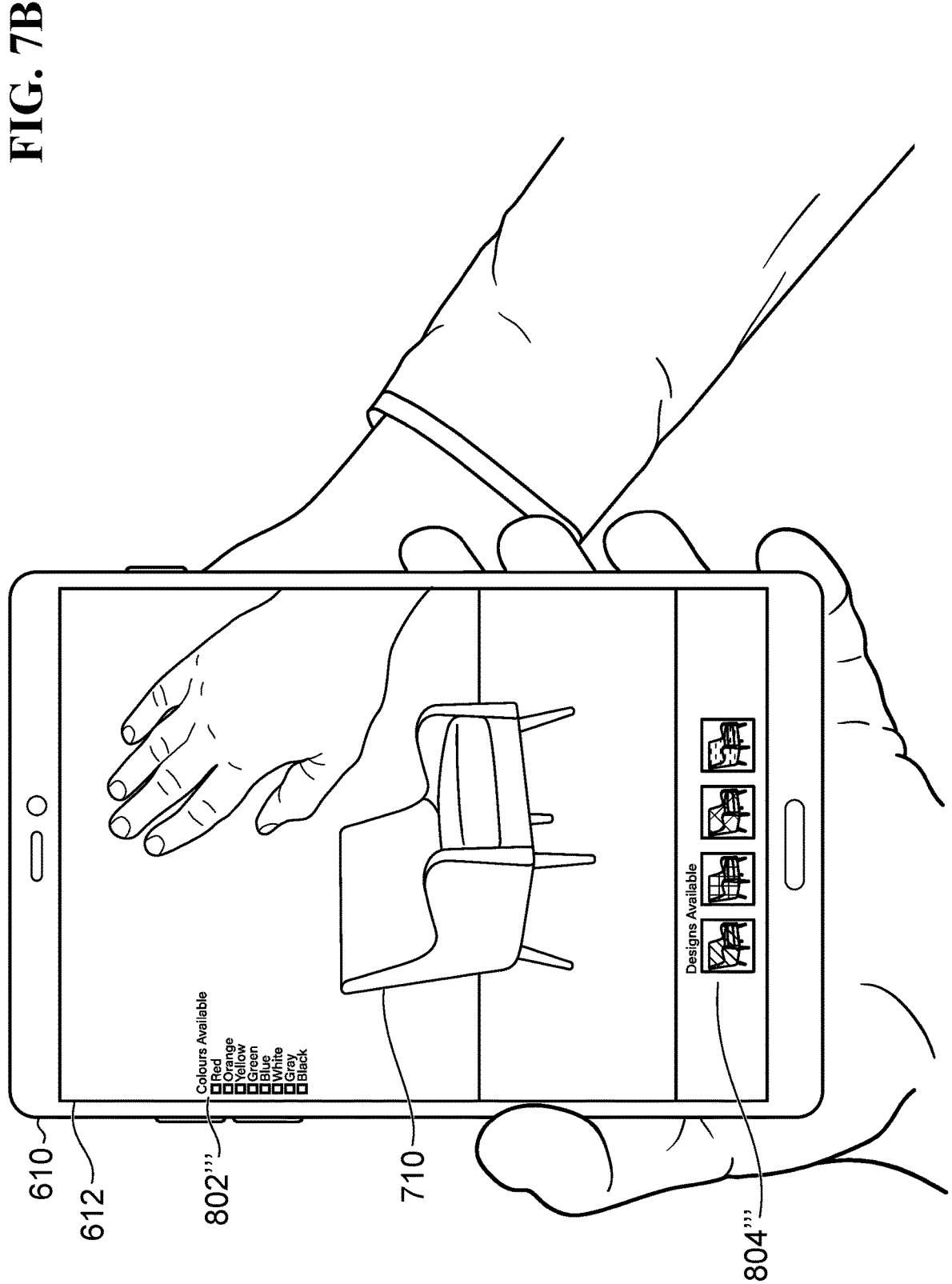
Figure 8:
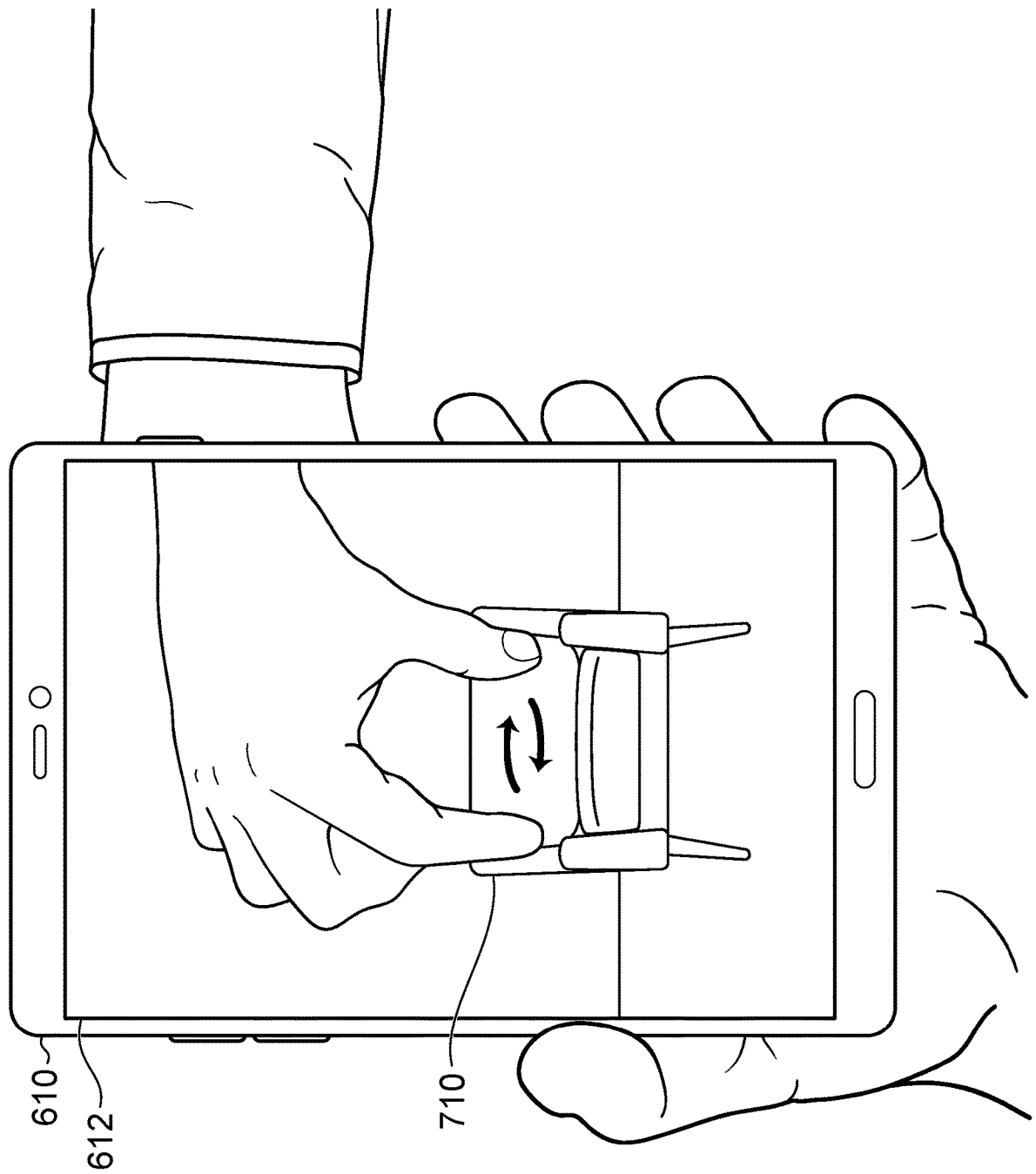
FIGS. 8-10 illustrate the user interacting with the AR content of FIG. 4 using a second interface, according to some embodiments.
Figure 9:
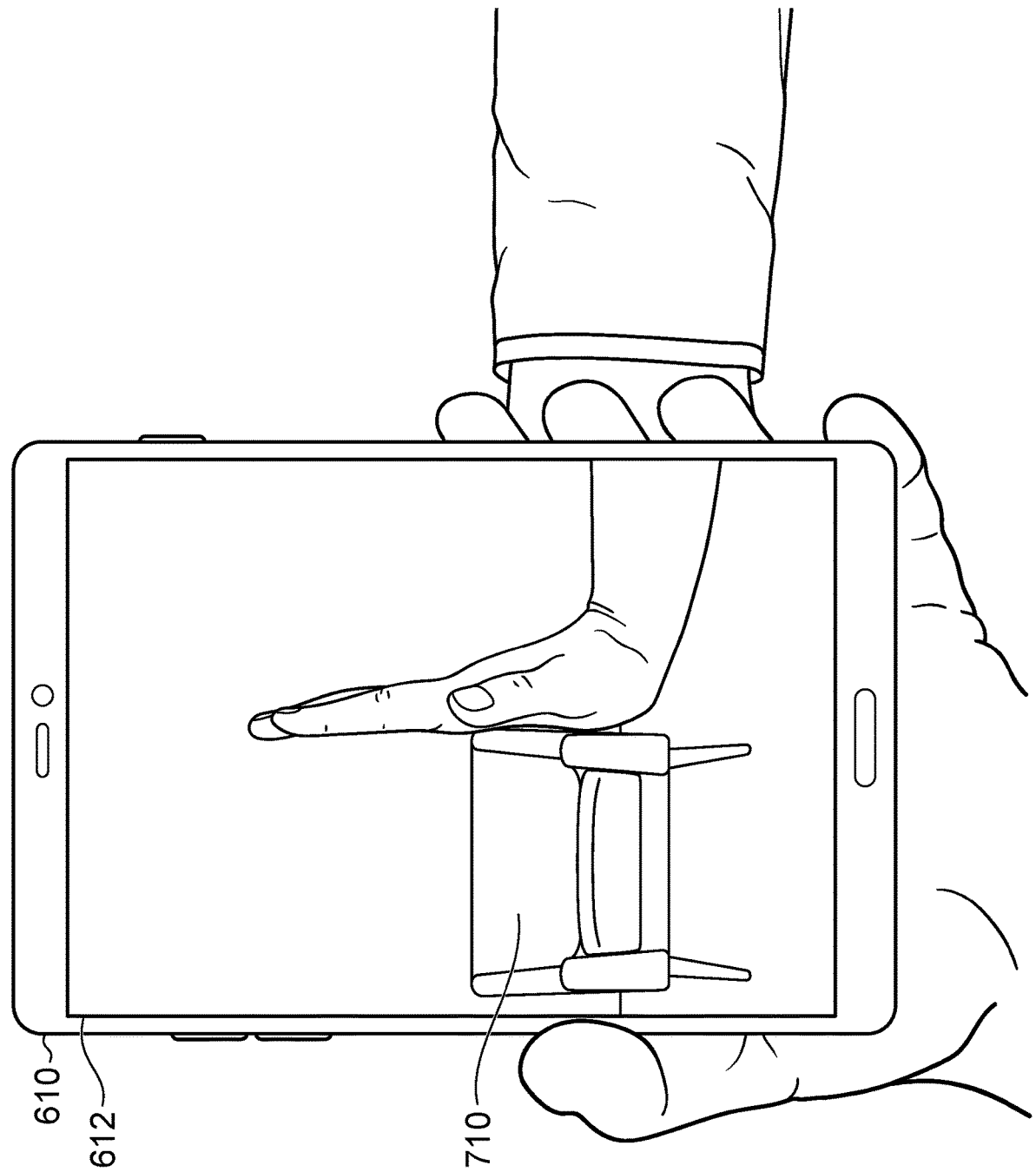
Figure 10:
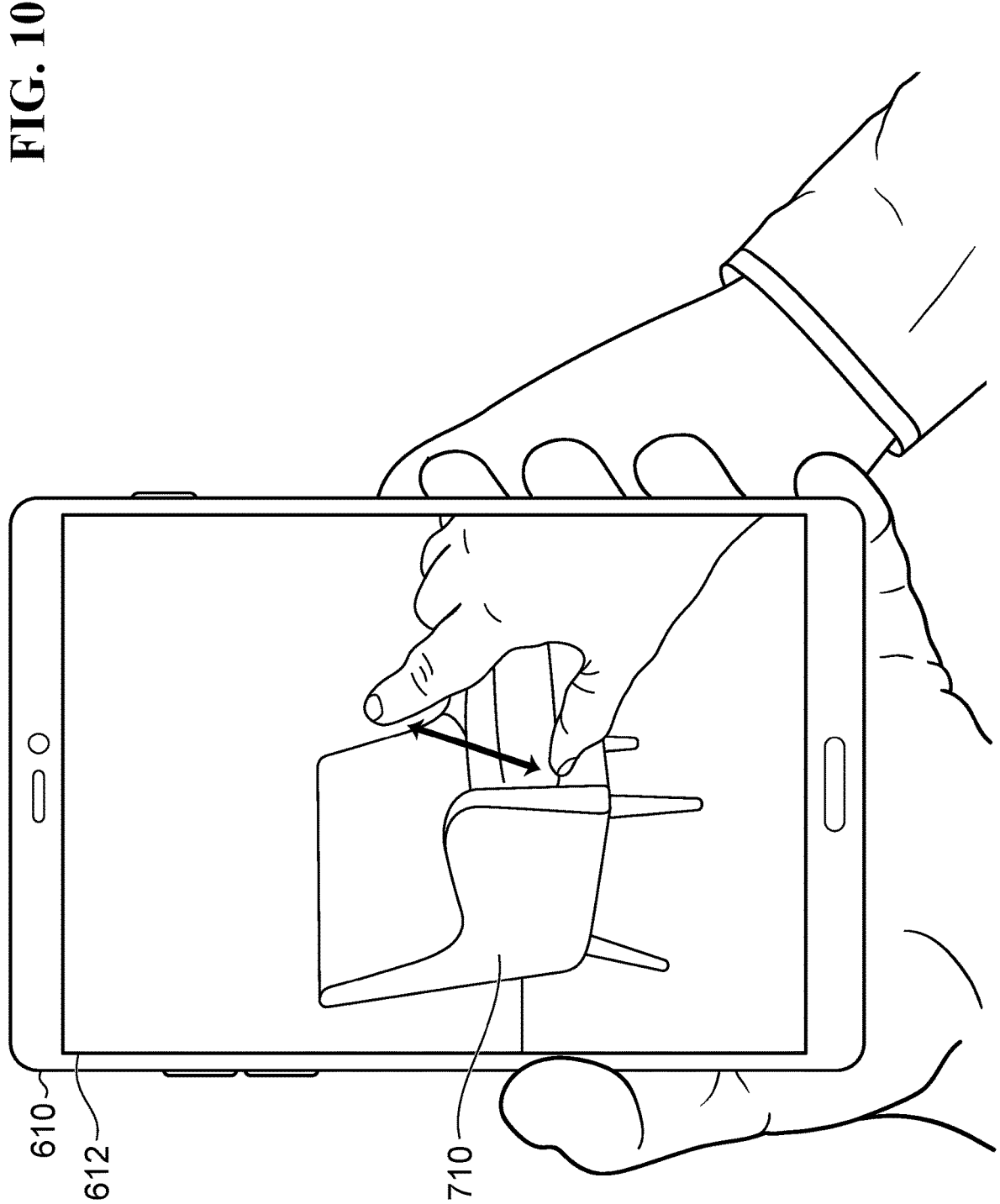

Returning to FIG. 2, at step 504, processor 404 may, subsequent to receiving the input corresponding to the interaction with the touch-based control of the device, detect a gesture performed in the real-world space depicted in the view. In some embodiments, the gesture may be a physical gesture performed by a user using their hand, a stylus, etc. In some embodiments, the gesture may be related to the AR content that was generated and overlaid onto the view of a real-world space. For example, FIGS. 8-10 show various hand gestures performed by a user in the real-world space depicted in the view displayed by user device 610, each of the gestures related to AR object 710. In the case of a hand gesture, processor 404 may detect a hand in the real-world space prior to detecting the hand gesture. In response to detecting the hand, the processor 404 may alter what is output for display by the device. Altering what is output for display may include reducing or removing one or more graphical user interface elements displayed by the device, or adding one or more graphical user interface elements to what is displayed by the device. For example, FIG. 5 shows various graphical user interface elements displayed by the user device 610, such as the colors panel 802 and the designs panel 804, and FIG. 6 illustrates a user's hand being detected in the real-world space depicted in the view displayed by the device 610. FIG. 6 shows that in response to the user's hand being detected, colors panel 802 has been altered to become a more faded color panel 802', and designs panel 804 has similarly been altered to become a more faded designs panel 804'. Additionally in FIG. 6, a graphical user interface element has been added to provide a glowing effect around AR object 710. FIGS. 7A and 7B also illustrate various graphical user interface elements that have been altered in response to detecting a user's hand. For example, in FIG. 7A, the colors panel 802 and designs panel 804 are altered to become a reduced colors panel 802" and a reduced designs panel 804". FIG. 7B also shows a reduced colors panel 802''' and a reduced designs panel 804'''. FIG. 8 illustrates an example embodiment where graphical user interface elements, namely colors panel 802 and designs panel 804, have been removed from the touch screen 612 in response to detecting the user's hand in the real-world space depicted in the view displayed by user device 610.

Figure 11:
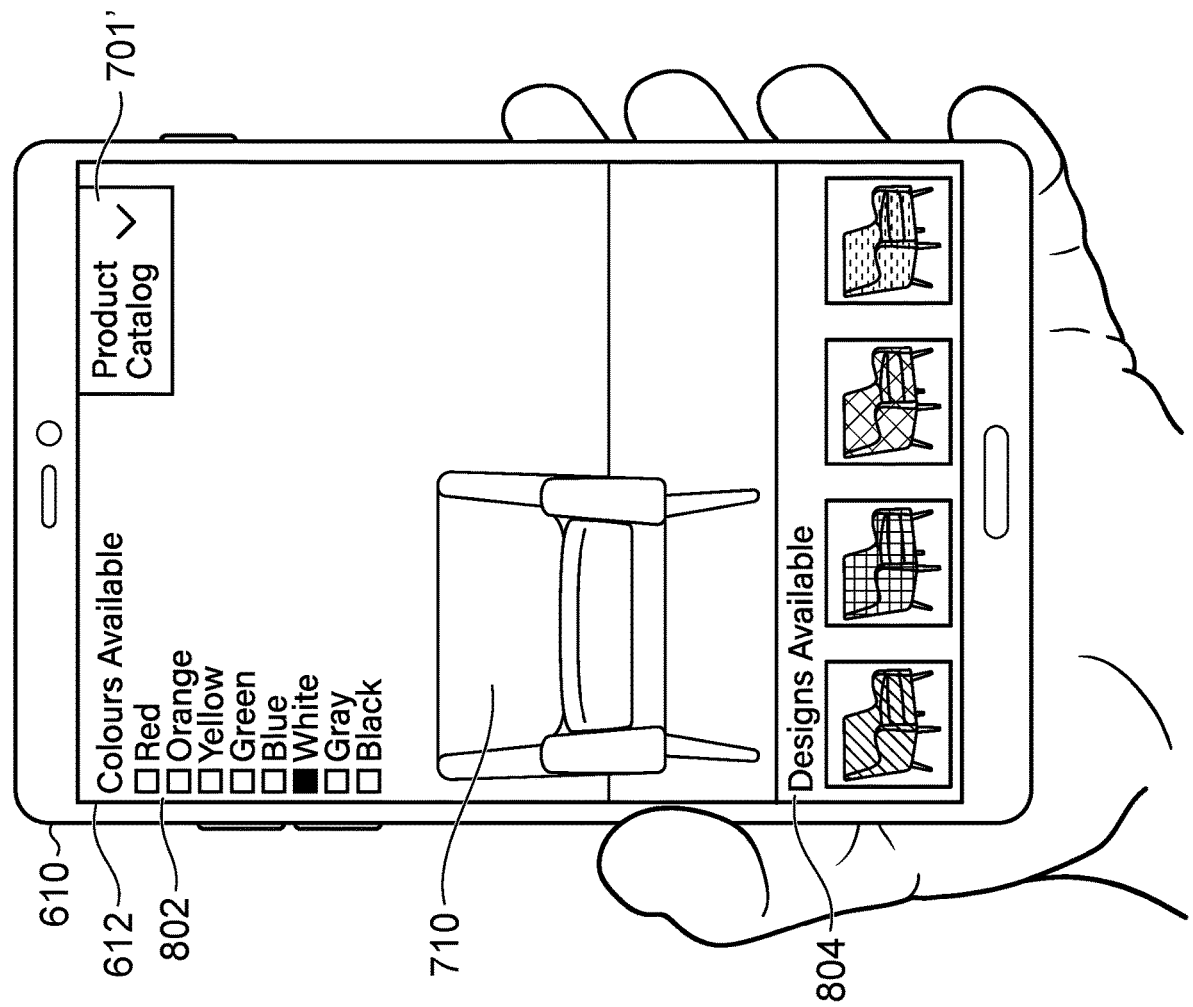
FIG. 11 illustrates the user's hand no longer being detected within the AR environment, according to some embodiments.

In embodiments where a graphical user interface element was reduced or removed in response to detecting the hand, in response to no longer detecting the hand in the real-world space, the processor 404 may further alter what is output for display by the device to restore at least some of the graphical user interface element that was reduced or removed. For example, as mentioned previously, FIG. 9 illustrates a particular hand gesture performed in the real-world space depicted in the view displayed by user device 610. As shown, graphical user interface elements such as colors panel 802 and designs 804 have been removed from the touch screen 612. FIG. 11 illustrates an embodiment where the user's hand is no longer detected in the real-world space, and therefore the colors panel 802 and designs panel 804 are restored and once again displayed by user device 610. In embodiments where a graphical user interface element was added in response to detecting the hand, in response to no longer detecting the hand in the real-world space, the processor 404 may further alter what is output for display by the device to remove the graphical user interface element that was added. For example, although not shown, in the embodiments illustrated by FIGS. 8-10, there may exist a graphical user interface element which provides a glowing effect around AR object 710, the element having been added in response to detecting a user's hand in the real-world space depicted in the view displayed by user device 610. In the embodiment illustrated by FIG. 11, the added graphical user interface element may then have been removed in response to the user's hand no longer being detected in the real-world space depicted in the view displayed by user device 610.

Returning to FIG. 2, at step 506, processor 404 may, responsive to detecting the gesture, manipulate the AR content. For example, processor 404 may detect each of the hand gestures illustrated in FIGS. 8-10 as corresponding to a particular manner in which to manipulate AR object 710. Therefore, in response to detecting the hand gestures, processor 404 may manipulate AR object 710 in the manner corresponding to the respective gesture. Manipulating the AR content may include at least one of rotating, modifying the location of, or modifying the dimension of the AR content. In FIG. 8, for example, processor 404 may detect a rotating hand gesture and in turn, manipulate AR object 710 by rotating the object 710 to show a different perspective than the perspective shown prior to the user performing the rotating hand gesture (e.g., the perspective shown in FIG. 8 is different from the prior perspective depicted in FIGS. 4-7B).

In some embodiments, an AR environment may be generated and displayed by a user device. The AR environment may include a view of a real-world space surrounding the user device. For example, FIG. 3 illustrates a user device 610 displaying an AR environment 620 generated by an AR engine 402 of AR system 400. The AR engine may be accessible through an application on the user device 612. The AR environment 620 may be based on a real-world space surrounding the user device, the real-world space including features such as a floor 602, a wall 604, and some furnishings such as a painting 606 and a table 608. Images of the real-world space may be captured by a sensor (not shown), such as a rear-facing camera, of the user device 610 and displayed on a screen of the user device 610, which may be a touch screen 612. Through a process known as simultaneous localization and mapping (SLAM), a virtual map representing the real-world space surrounding the user device can be built and aligned with the real-world space captured by the sensor. This virtual map is not visible to the user and may enable the placement of AR content within the view of the real-world space shown on the touch screen 612. The view of the real-world space shown on the touch screen 612, within which AR content can be placed, may be called an AR environment 620.

A SLAM process used herein may generally proceed as follows. AR engine 402 may first collect and process data from a sensor, such as the rear-facing camera of user device 610. To improve accuracy, user device 610 may include other sensors such as an accelerometer, gyroscope, light sensor, depth sensor, etc. and the data from the rear-facing camera may be combined with data from one or more of these sensors. The AR engine may then identify key feature points from the collected data. A feature point may be a distinctive location in an image, for example an image of the real-world space captured by the rear-facing camera of user device 610. For example, a group of feature points which share the same planar surface may be recognized as being a surface such as the floor 602 or wall 604. The AR engine may perform calculations to estimate the feature points' relation in space, as well as the location of the user device 610 with relation to the feature points. Based on the calculations and estimations, the SLAM process may be used to generate a virtual map of the real-world space around the user device 610. Through SLAM, a representation of the real-world space surrounding the user device 610 and the position of the user device 610 within that real-world space can be continuously or intermittently determined by AR engine 402. Algorithms used to perform the SLAM process may be stored in memory 406 of AR engine 402.

Once the AR environment 620 is established, various graphic user interface elements may be displayed on a device screen so that a user can select AR content to be generated and displayed in the AR environment. In the context of commerce, for example, a user may be presented with a virtual product catalog. For example, FIG. 4 shows a virtual product catalog 701 displayed on the touch screen 612 of user device 610. For the sake of clarity, objects in the real-world space such as painting 606 and table 608 have been omitted. Virtual product catalog 701 may show various products sold by a merchant, represented by selectable graphical user interface elements 702, 704, and 706. As shown, for example, graphical user interface element 706 may include an image of a chair sold by the merchant. The user may be able to browse through the virtual product catalog 701 by using a swiping motion. For example, if the products represented by graphical user interface elements 702, 704, and 706 are not of interest the user, the user may touch any part of virtual product catalog 701 with their fingertip and perform a light flicking motion to the left or to the right to view other products sold by the merchant (not shown). In the embodiment depicted in FIG. 4, the product represented in graphical user interface element 706 may be of interest to the user. The user may tap the element 706 with their finger, as shown. As a result, an AR object 710 may be generated and placed in the AR environment 620, i.e., the AR object 710 may be overlaid onto the view of the real-world space depicted on touch screen 612. The AR engine 402 may be aware that the AR object 710 represents a product, shown here as a chair, typically positioned on the floor in a room, and therefore may anchor the AR object 710 to the floor 602 which was detected during the SLAM process. This AR object 710 may be accurately scaled within the AR environment depicted on the touch screen 612. For example, the 3D model record 410 may store dimension information related to the real-life counterpart of AR object 710. User device 610 may include a lidar, radar, sonar, or other sensor which can measure the distance between the user device 610 and any point or points (e.g. an anchor to which corresponding point(s) of the AR object 710 can be affixed) of the real-world space captured by the device 610. Therefore, wherever AR object 710 is positioned in the AR environment, the dimension information and the data gathered using one or more distance-related sensors may be used to scale AR object 710 within the AR environment. In this way, the user may be able to accurately visualize how the AR object 710 would appear if it were actually placed in the real-world space surrounding the user.

The way in which virtual product catalog 701 is illustrated in FIG. 4 is only an example of how such a product catalog may be presented to a user. In some embodiments, the virtual product catalog 701 may be presented such that a user performs other movements, such as dragging and dropping, pressing and holding, sliding, double tapping, etc., on the touch screen 612 to browse through graphical representations of products sold by the merchant and to, ultimately, select an AR object to be displayed from the virtual product catalog.

In some embodiments, once AR content has been generated and displayed in an AR environment displayed by a device, a user may be able to interact with the AR content using a touch-based control of the device. For example, FIG. 5 illustrates a user interacting with AR object 710 using the touch screen 612 of user device 610. In the illustrated embodiment of FIG. 5, once the user has selected an object of interest, i.e., AR object 710, to be generated as part of the AR content, virtual colors panel 802 and virtual designs panel 804 associated with AR object 710 may be displayed on the touch screen 612. At or near the same time, virtual product catalog 701 may be minimized to become a reduced virtual product catalog 701', or otherwise reduced or removed. Virtual colors panel 802 may present the different colors available for AR object 710, and virtual designs panel 804 may present the different designs available for AR object 710. The user may use touch screen 612 to browse through the different colors and designs and select a preferred color and design of AR object 710. For example, the user may wish to view AR object 710 in a red color and having diagonal stripes. The user may therefore tap the text "Red" or the box next to the text "Red", and the touch screen may in response display the AR object 710 in a red color instead of the white color as shown. The user may additionally tap the leftmost graphical user interface element in the virtual designs panel 804, and the touch screen may in response display the AR object 710 having diagonal stripes. As shown, the virtual designs panel may be presented as a carousel, such that there may be other designs available for the AR object 710 that the user may view and choose from by making a swiping motion on the portion of the touch screen 612 which displays the virtual designs panel 804.

The way in which the virtual colors and designs panels 802, 804 are illustrated in FIG. 5 is only an example of how such panels can be presented to a user. In some embodiments, for example, the virtual colors panel 802 may additionally include user interface elements that allow the user to further customize the color (e.g., there may be a tappable "View further options" phrase which can be tapped by the user to view more colors, gradients of colors, etc.). In some embodiments, the touch screen 612 may display the virtual colors panel 802 as a color wheel with or without text, and the user may make a circling motion on the touch screen 612 to browse through the available colors. In some embodiments, the virtual colors panel may be presented as a carousel such as so that the user can make swiping motions on the touch screen 612 to view the available colors. In some embodiments, instead of displaying boxes corresponding to each color that the user can tap, there may be one continuous bar with a level that the user can press and slide along the bar to choose a preferred color. The virtual designs panel 804 may similarly be presented in various other formats, such as with text describing the respective design, a slider bar, etc.

How the virtual colors and designs panels 802, 804 are presented may differ depending on the generated AR content. Particularly, the panels 802, 804 may be presented in a way that least hinders the user's view of the AR content. For example, if the AR object 710 were much taller than as shown in FIG. 5 such that the virtual colors panel 802 as currently shown would hinder the user's view of AR object 710, the touch screen 612 may present the colors panel 802 in a way that does not hinder, or minimally hinders, the user's view of the AR object 710 (e.g., by omitting the text describing the colors and instead showing the actual colors in the respective boxes).

There may be various other virtual panels (not shown) which present other options for the user to further customize the appearance of AR object 710. For example, there may be a virtual materials panel which lists or illustrates the different materials available for AR object 710, such as leather, linen, cotton, etc. There may also be a sizes panel which lists or illustrates different sizes available for AR object 710.

In some embodiments, a user's hand may be detected in the real-world space depicted by a device. The hand may be captured by an imaging sensor such as a camera, lidar sensor, or another type of sensor. For example, FIG. 6 illustrates a user's right hand being captured by the rear-facing camera of user device 610. The hand may additionally simultaneously be captured by another sensor such as a lidar sensor. The hand may be detected and recognized as being a hand, as opposed to another object, by use of computer vision. In some embodiments, instead of or in addition to detecting a user's hand, there may be another specific object or feature that the AR system can recognize, such as a stylus held by the user's hand. Therefore, more generally, in any instances in the description in which detection of a hand is being discussed, what may be detected instead is a moveable object controlled by the user, where the object could be a hand, another body part, a stylus, or something else controlled by the user. Detection of the object (or no longer detecting the object) may alter what is output for display on the device.

Using computer vision to detect the user's hand may involve the following. One or more images captured by the rear-facing camera of the user device 610 may be analyzed to isolate the hand from the background. For example, subsequent image frames may be compared to detect movement by the hand which may be different to any movement in the background, or skin-color filtering may be used to classify the pixels of an image into one of two classes, namely "hand" and "background". If using skin-color filtering, a process known as edge detection may additionally be performed to identify the edge of the hand, which involves identifying those pixels at which the image brightness has discontinuities. When the boundary of the hand is determined by accurate edge detection, the pixels within that boundary can be detected as the hand, and features within the boundary can be computed such as the area, perimeter, and shape.

In some embodiments, the user may be prompted using visual, auditory, and/or haptic indications to place a hand "behind" user device 610 such that it is captured by a sensor such as the user device's rear-facing camera. Alternatively, the user may intuitively reach towards where the AR object 710 would be if it were physically existed in the real-world space depicted in the AR environment. In some embodiments, the user may be aware that the hand can be detected in the real-world space and subsequently used to perform gestures to interact with AR object 710 and may therefore communicate to the AR system 400, for example by using the touch screen 612 of user device 610, that they wish to use their hand.

In some embodiments, in response to a user's hand being detected in the real-world space depicted by a device, the AR system may alter what is output for display by the device. In some embodiments, for example, various graphical user interface elements may be reduced or removed. For example, FIG. 6 illustrates an embodiment where, in response to detecting the user's right hand using the rear-facing camera of device 610, the virtual colors panel 802 and the virtual designs panel 804 have been altered to become more transparent virtual panels 802' and 804' respectively, i.e., the degree of contrast of the panels 802, 804 has been reduced. Reduced virtual product catalog 701' may have been removed from the touch screen 612 as shown, or may remain as virtual product catalog 701'. FIGS. 7A, 7B and 8 illustrate additional examples of how the virtual colors panel 802 and virtual designs panel 804 may be reduced or removed in response to detecting the user's hand in real-world space depicted by user device 610. For example, in FIG. 7A, virtual colors and designs panels 802, 804 have been reduced to become a minimized virtual colors panel 802" and a minimized virtual designs panel 804". In FIG. 7B, virtual colors and designs panels 802, 804 have been reduced to become a smaller virtual colors panel 802''' and a smaller virtual designs panel 804'''. In FIG. 8, virtual colors and designs panels 802, 804 have been altogether removed from the touch screen 612 in response to the detection of the user's right hand. Such alterations involving reducing or removing certain graphical user interface elements, such as the virtual colors and designs panels 802, 804, may communicate to the user that those user interface elements are not to be interacted with when the user's hand is "behind" user device 610, i.e., detected within the AR environment. The reducing or removing of certain graphical user interface elements may additionally provide a less hindered view of the AR object 710 and the rest of the AR environment, which may help the user better visualize how AR object 710 will appear within the real-world space surrounding user device 610, and/or may provide the user with a more immersive AR experience.

Additionally, or alternatively, in some embodiments various graphical user interface elements may be added to what is displayed by a device in response to a user's hand being detected in the real-world space depicted by a device. For example, FIG. 6 illustrates an embodiment where a graphical user interface element has been added to provide a glowing effect around AR object 710. In some embodiments, a customizable "skin" (not shown) may be overlaid on top of the detected user's hand, e.g., to make the user's hand appear to be a different color or look like that of a furry animal or a reptile, within the AR environment displayed on the touch screen 612. In some embodiments, some of the graphical user interface elements may serve as a guide to the user. For example, touch screen 612 may display a first phrase with text like, "You can now interact with the AR object using hand gestures!", and/or display a second phrase with text like, "Try rotating the object by rotating your hand," along with a virtual hand showing the corresponding rotating movement.

In some embodiments, once the hand of a user (or other object, such as a stylus) has been detected by the AR system, the user can perform gestures using the hand (or other object) to manipulate at least a portion of the generated AR content. AR system 400 may recognize hand gestures implementing OpenCV Python, MediaPipe, or other open-source software frameworks. The recognized gestures may be quantized gestures such as a grabbing gesture, or continuous gestures such as a dragging and dropping gesture.

The AR system 400 may therefore allow a user to dynamically switch between two user interfaces and to use the interface that may be most intuitive to the user in a given circumstance or for a given operation. For example, in circumstances where a user wishes to browse through a product catalog displayed on a device or for operations such as those related to selecting or customizing a product from a product catalog, a user may find it more intuitive to interact with a first user interface (e.g., the two-dimensional touch screen of a user device). By contrast, in circumstances where a user wishes to manipulate AR content displayed on a device or for operations such as those related to moving a generated AR object, the user may find it more intuitive to interact with a second user interface (i.e., the real-world space as captured by a camera of the user device).

For example, FIGS. 8-10 illustrate the user interacting with and manipulating AR object 710 by using hand gestures. The user may be prompted, for example with visual indications on touch screen 612 or auditory indications generated by the device 610, to manipulate, e.g., rotate, move, or scale, AR object 710 by performing particular gestures with the detected hand. The user may further be coached, through visual or auditory indications, in performing those gestures. The user may also intuitively, and without prompting or coaching, perform the hand gestures required to manipulate AR object 710.

FIG. 8 shows an embodiment where the user has performed a rotating gesture using the user's hand to rotate AR object 710 from the position shown in FIGS. 4-7B, to a position where the entirety of the back of the AR object 710 faces the wall and the entirety of the front of the AR object 710 faces the user. The user may wish to rotate AR object 710 to see how the chair depicted by AR object 710 looks from a different perspective, or to visualize how the chair would look in the rotated position in the real-world space surrounding user device 610. Although FIG. 8 depicts the rotating motion to have been performed using a gesture mainly utilizing the index finger and thumb of the user's detected hand, this is only an example. Other gestures may be used to rotate the AR object 710, e.g., a gesture involving a single finger performing a circling movement, rotating the entire hand using the wrist, etc. Regardless, all of the gestures that may be used to rotate AR object 710 may include some sort of rotation component. Performing a hand gesture involving a rotating motion to rotate AR object 710 may be easier, and feel more intuitive and natural to the user when compared to rotating an AR object by using only a touch-based control like the touch screen 612 of device 610, as the hand gesture may mimic the kind of gesture the user may make when rotating a real-world object.

FIG. 9 shows an embodiment where the user has performed a pushing gesture with the detected hand to move the rotated AR object 710 more to the left in the AR environment, relative to its position as shown in FIG. 8. The user may wish to move AR object 710 in this way to visualize how the real-life counterpart of AR object 710 would look in the real-world space surrounding the user device 610, at this new position. Although FIG. 9 depicts the detected hand performing the pushing motion by having the hand in an upright position, facing the user's palm towards the AR object 710 in the AR environment, and sliding the hand to the left, this is only an example. Other gestures may be used to move the AR object 710, e.g., a gesture involving a flicking motion, a pointing and pushing motion, a nudging motion, dragging and dropping motions, grabbing and releasing motions, etc. Regardless, all of the gestures that may be used to move AR object 710 may involve some sort of directional component corresponding to the direction the user wishes the AR object to be moved. Performing a hand gesture that includes a directional or pushing motion to move AR object 710 within the AR environment may be easier, and feel more intuitive and natural to the user when compared to moving an AR object by using only a touch-based control like the touch screen 612, as the hand gesture may mimic the kind of gesture the user may make when rotating a real-world object.

FIG. 10 shows an embodiment where the user has performed a stretching or unpinching gesture with the detected hand to enlarge the size of AR object 710, relative to its size as shown in FIGS. 4-9. The user may wish to enlarge the size of AR object 710 in order to view it more closely, e.g., to examine a specific portion of AR object 710. If the user wishes to compress the size of AR object 710, this can be achieved by performing a pinching gesture with the detected hand. Although FIG. 10 illustrates the unpinching gesture to have been performed using mainly the index finger and thumb of the user's detected hand, this is only an example and other gestures may be used to enlarge the AR object 710, e.g., an unpinching gesture but involving all fingers of the detected hand. In some embodiments, stretching or unpinching gestures may be used to replace the AR object 710 with differently-sized variants of the represented object (e.g. a pinch to reduce a sofa with 3 seats to a sofa with 2 seats).

As discussed previously, the AR object 710 as depicted in FIG. 4 (and subsequently in FIGS. 5-9) may be accurately scaled within the AR environment to allow the user to accurately visualize the AR object 710 within the real-world space surrounding user device 710. Therefore, in some embodiments, the AR system may provide for a way to ensure that the AR object 710 is once again properly scaled after the user has enlarged and/or compressed it to their satisfaction. For example, there may be an additional gesture that can be performed by the user's detected hand to revert the AR object 710 to its correctly scaled size, or the AR object 710 may automatically be reverted to its correctly scaled size after a set duration of time has passed after a pinching or unpinching gesture.

In some embodiments, the AR system may allow for the manipulation of an AR object by the use of gestures when the detected hand (or other recognized object, like a stylus) is in visually simulated physical contact with the AR object. For example, in the embodiments illustrated by FIGS. 8-10, it is apparent that the user's detected hand is in visually simulated contact with AR object 710 when performing the hand gestures related to manipulating the AR object 710. In such embodiments, at the time of visually simulated contact between the AR object and the user's detected hand, the user may be provided with a visual, audio, or haptic indication (e.g. to the user's other hand) that contact has occurred. AR system 400 may know when the visually simulated contact has been established by analyzing images captured by the rear-facing camera of device 610 and determining that pixels of the detected hand and pixels of the AR object 710 overlap, for example. In some embodiments, the AR system may allow for the manipulation of AR content by the use of gestures even though the detected hand (or other recognized feature) is not in visually simulated physical contact with the AR object. For example, after a user's hand has been detected, the detected hand may perform a rotating gesture from a position where there is no (simulated) contact between the hand and an AR object, and the AR object may regardless be rotated according to the gesture.

In some embodiments, in response to a user's hand no longer being detected in the real-world space depicted by a device, the AR system may further alter what is output for display by the device. In some embodiments, for example, graphical user interface elements that were previously reduced or removed in response to the user's hand being detected, may be partially or fully restored in response to the user's hand no longer being detected. For example, FIG. 11 illustrates the user's hand no longer being detected by the rear-facing camera and/or other sensor. In response to the hand no longer being detected within the AR environment shown on the touch screen 612, it is apparent that the reduced virtual product catalog 701', virtual colors panel 802, and virtual designs panel 804, which were reduced or removed in response to the user's right hand being detected, have been restored.

Figure 12:
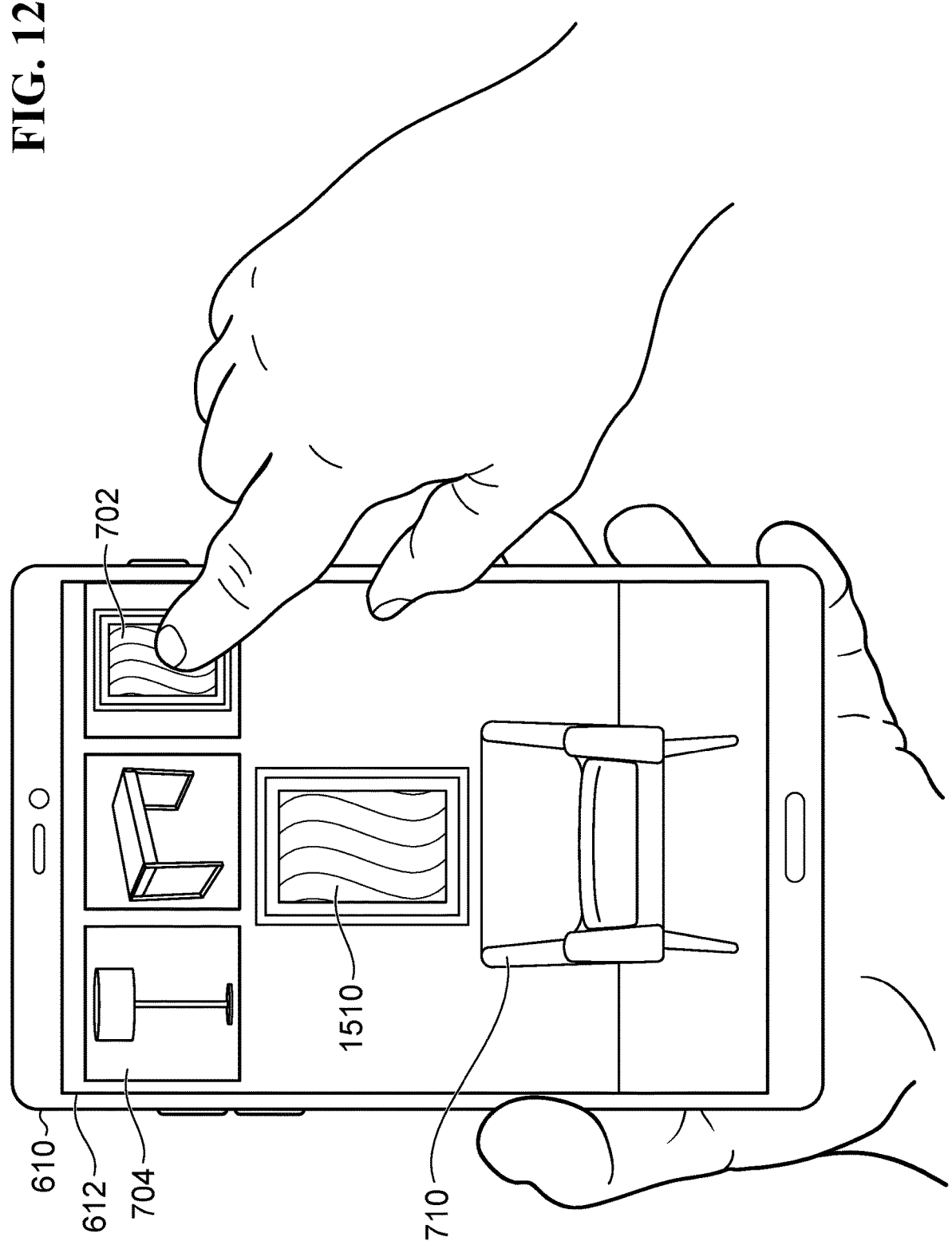
FIG. 12 illustrates the user device of FIG. 3 displaying additional dual-interface interactable AR content within the AR environment, according to some embodiments.

A user may wish for additional AR content to be generated within an AR environment. For example, FIG. 12 illustrates a user using the touch screen 612 to browse the virtual product catalog panel 701, and tapping (or otherwise interacting with) graphical user interface element 702 to result in the generation and presentation of an AR object 1510 in the AR environment 620. To access the virtual product catalog panel 701, the user may have dragged downwards (or otherwise interacted with) the reduced virtual product catalog panel 701'. The AR engine 402 may be aware that the AR object 1510 depicts a product, illustrated here as a picture frame, typically located on a vertical wall in a room, and therefore may anchor the AR object 1510 against the wall 604 which was detected during the SLAM process. As described with respect to AR object 710, the AR object 1510 may be accurately scaled within the AR environment depicted by the touch screen 612.

Figure 13:
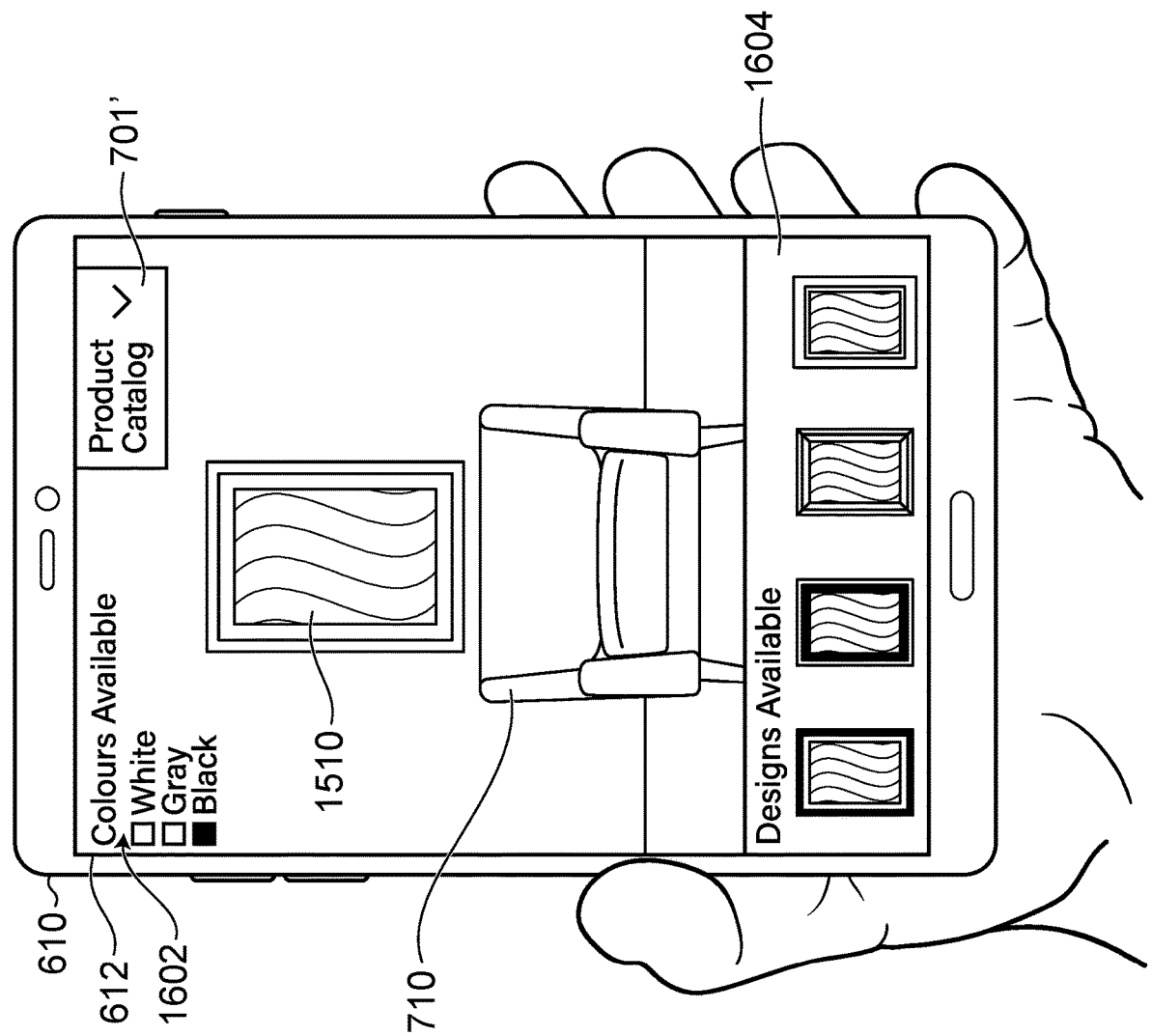
FIG. 13 illustrates the user interacting with the additional AR content of FIG. 12 using the first interface, according to some embodiments.

In some embodiments, a user may be able to interact with the additional AR content using a touch-based control of the device. For example, FIG. 13 illustrates a user interacting with the AR object 1510 using the touch screen 612 of user device 610. A virtual colors panel 1602 and a virtual designs panel 1604 associated with AR object 1510 may be displayed on the touch screen 612. At or near the same time, virtual product catalog 701 may once again be altered to become reduced virtual product catalog 701'. Virtual colors panel 1602 may present the different colors available for AR object 1510, and virtual designs panel 1604 may present the different designs available for AR object 1510. As discussed in relation to AR object 710, the user may use touch screen 612 to browse through the different colors and designs and select a preferred color and design for AR object 1510. In some embodiments, a user may be able to toggle between choosing the preferred color, design, material, size, or any other customizable feature of AR object 1510 and AR object 710. For example, the user depicted in FIG. 13 may have selected their preferred color and design for AR object 1510, and may subsequently wish to view a different color and/or design of AR object 710. In some embodiments, the user may tap the AR object 710 on the touch screen 612, and in response the virtual colors and designs panels 1602, 1604 may be replaced by virtual colors and designs panels 802, 804, respectively. The user may then change the color and design settings for AR object 710 by interacting with the panels 802, 804, for example, in the manners described previously. The user may then tap the AR object 1510 on the touch screen 612 to bring back the virtual colors and designs panels 1602, 1604 and change the color and/or design for AR object 1510.

The methods described above with respect to manipulating AR object 710 within the AR environment similarly applies to manipulating AR object 1510. For example, a user may move one of their hands "behind" user device 610 such that it is captured and detected using an imaging sensor such as the rear-facing camera, lidar sensor, or another type of sensor of the user device 610. The user may subsequently perform gestures with the detected hand to manipulate, e.g., rotate, move, and/or scale, the AR object 1510.

In some embodiments, the methods described herein may be applied to an AR system which includes a mobile device and an AR headset or AR glasses. The AR headset or glasses may be worn by a user. The AR headset or glasses may communicate with AR engine 402 over network 420. In some embodiments, a user may use a mobile device having a touch-based control, such as a touch screen or a keyboard, to browse a virtual product catalog offered by a merchant. Unlike the embodiments discussed above in relation to FIGS. 3-13, the mobile device may display only the virtual product catalog, and not an AR environment. Instead, the AR environment may only be presented to the user on a screen included in the AR headset or AR glasses. In embodiments where the AR system includes an AR headset, the headset may include a sensor, such as a camera, to capture images of the real-world space surrounding the worn headset. The captured images may be used to develop the AR environment. In embodiments where the AR system includes AR glasses, the glasses may include a transparent device screen through which the user may see the real-world space surrounding the glasses. Once the user selects a particular product of interest using the touch-based control of the mobile device, an AR model of the product may be generated and presented within the AR environment depicted in the headset or glasses screen such that it appears that the AR model is physically present in the real-world space surrounding the user. The user may be able to customize the appearance (e.g., color, design, material, size, etc.) of the AR model by interacting with graphical user interface elements provided on the mobile device screen. The AR headset or AR glasses may include a sensor to detect the user's hand and hand gestures. If the user wishes to manipulate (e.g., rotate, move, scale) the AR model, the user may reach out with their hand towards the AR model and manipulate the AR model using hand gestures in the manners described above. By using an AR headset or AR glasses in combination with a mobile user device, there may be no occlusion of the AR environment presented to the user with graphical user interfaces related to selecting a product of interest and customizing the appearance of a corresponding AR model. In other embodiments the AR headset or AR glasses might not have a relevant sensor (e.g. camera) and the AR system may instead make use of a camera on the mobile device as described above, the AR system further transforming the data received from the camera of the mobile device such that it can be displayed correctly in the coordinate system of the AR headset or AR glasses.

In embodiments described herein computer functionality is improved by implementing user interaction with the AR content via both a touch-based control and a gesture detected in the real-world space, rather than implementing all user interaction with the AR content via only touch-based control or via only gestures detected in the real-world space. The complexity of the computer operations is decreased because it is not required to implement sensing and software that is complex enough to reliably distinguish between all types of interaction via a single interface (e.g. the touch screen does not need to distinguish between swiping between models and repositioning a model). Rather, a respective different set of interactions may be implemented at each interface (e.g. the touch screen may be used for swiping between models and the hand gesture performed in the real-world space and captured by the camera may be used for repositioning a model). Computer functionality is also improved by improving machine-user interaction. The input gestures are distributed between the two user interfaces, allowing the user to dynamically switch between the two and to use the interface that may be most intuitive to the user. In embodiments in which a graphical user interface element is altered based on detection of the hand (or other object), machine-user interaction is improved by providing the technical benefits described herein, e.g. indicating to the user that hand gestures are activated, and/or providing a less hindered view of the AR object, and/or providing a more immersive AR experience, etc.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 14:
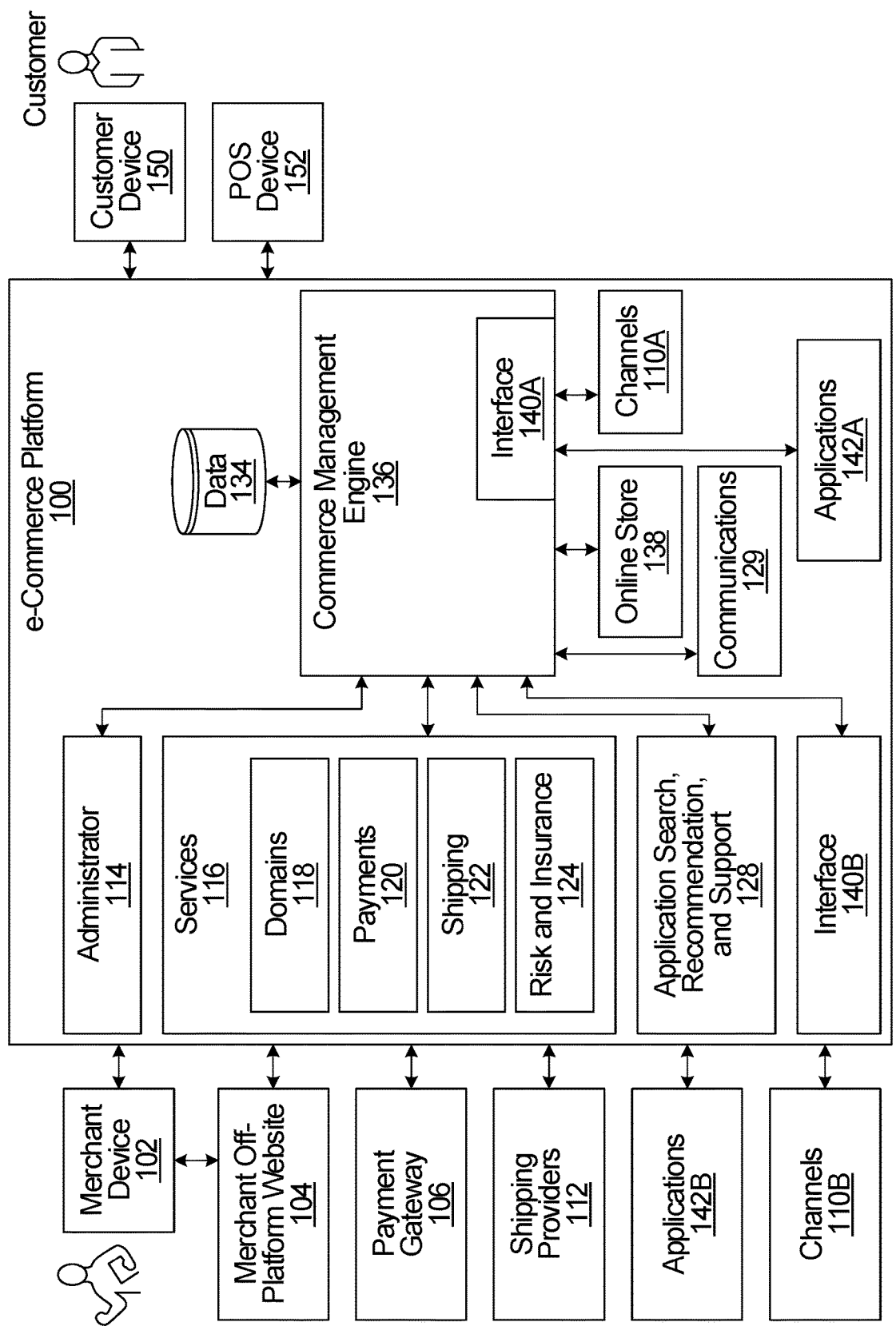
FIG. 14 is a block diagram of an e-commerce platform, according to some embodiments.

FIG. 14 illustrates an example e-commerce platform 100, according to some embodiments. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 14, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 15 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 15. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 14, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In some embodiments, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 16:
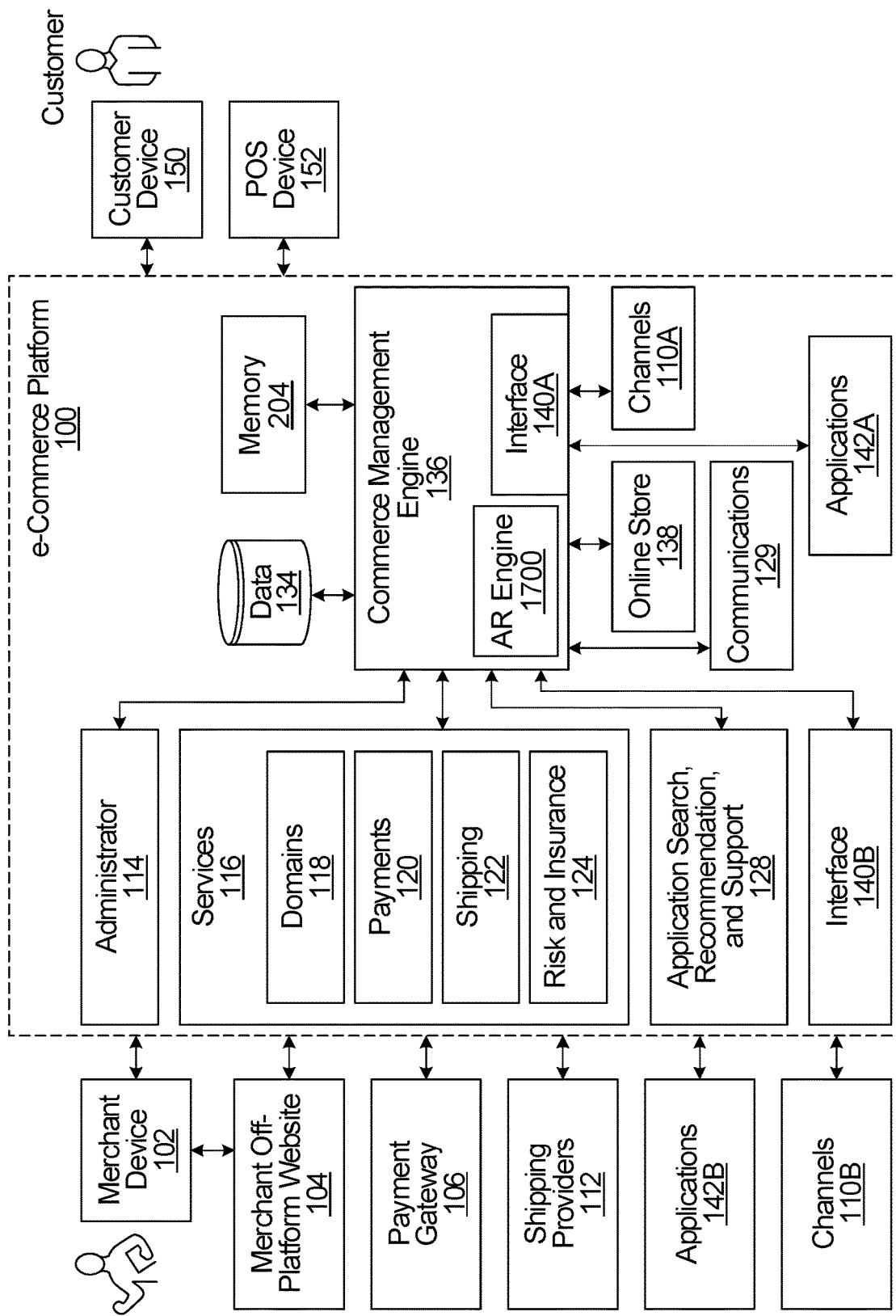
FIG. 16 illustrates the e-commerce platform of FIG. 14, but including an AR engine.

FIG. 16 illustrates the e-commerce platform 100 of FIG. 14, but with the addition of an AR engine 1700 and a memory 204. The AR engine 1700 is an example of a computer-implemented system that generates AR content for use by the e-commerce platform 100, the customer device 150 and/or the merchant device 102. In some embodiments, the AR engine 1700 may be AR engine 402. Although the AR engine 1700 is illustrated as a distinct component of the commerce management engine 136 of e-commerce platform 100 in FIG. 16, this is only an example. An AR engine could also or instead be provided by another component residing within or external to the e-commerce platform 100. In some embodiments, either or both of the applications 142A-B provide an AR engine that is available to customers and/or to merchants. The AR engine 1700 may be implemented by one or more general-purpose processors that execute instructions stored in a memory (e.g. in memory 204) or stored in another computer-readable medium. The instructions, when executed, cause the AR engine 1700 to perform the operations of the AR engine 1700, e.g., the operations described earlier in relation to FIG. 2. Alternatively, some or all of the AR engine 1700 may be implemented using dedicated circuitry, such as an ASIC, a GPU, or a programmed FPGA.

In some embodiments, the e-commerce platform 100 may include multiple AR engines that are provided by one or more parties. The multiple AR engines may be implemented in the same way, in similar ways and/or in distinct ways. In addition, at least a portion of an AR engine may be implemented in the merchant device 102 and/or in the customer device 150. For example, the customer device 150 may store and run an AR engine locally as a software application.

The AR engine 1700 may implement at least some of the functionality described herein. Although the embodiments described below may be implemented in association with an e-commerce platform, such as (but not limited to) the e-commerce platform 100, the embodiments described above are not limited to the specific e-commerce platform 100 of FIGS. 14 to 16. Further, the embodiments described herein do not necessarily need to be implemented in association with or involve an e-commerce platform at all. In general, any applications of AR could implement the systems and methods disclosed herein.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
    receiving an input corresponding to interaction with a touch-based control of a device, the input defining an operation related to augmented reality (AR) content that is overlaid onto a view of a real-world space and displayed by the device;
    detecting a real-world object within the real-world space visible in the view of the real-world space displayed by the device;
    responsive to detecting the real-world object within the real-world space visible in the view of the real-world space displayed by the device and prior to detecting a gesture performed using the real-world object, revealing more of the real-world space in the view of the real-world space displayed by the device by altering what is output for display by the device by at least one of reducing, removing, or altering a graphical user interface element that was overlaid on the view of the real-world space displayed by the device before the real-world object was detected within the real-world space visible in the view of the real-world space;
    subsequent to receiving the input corresponding to the interaction with the touch-based control of the device and subsequent to altering what is output for display by the device responsive to detecting the real-world object, detecting the gesture performed using the real-world object within the real-world space visible in the view;
    responsive to detecting the gesture, manipulating the AR content; and
    responsive to no longer detecting the real-world object within the real-world space visible in the view of the real-world space displayed by the device, further altering what is output for display by the device to restore at least some of the graphical user interface element that was reduced, removed, or altered.

2. The computer-implemented method of claim 1, wherein the touch-based control comprises a first sensor of the device and wherein the device further comprises a second sensor different from the first sensor, the second sensor used for detecting the gesture performed in the real-world space depicted in the view.

3. The computer-implemented method of claim 2, wherein the touch-based control is disposed on a first side of the device and the second sensor is disposed on a second side of the device, the first side opposite the second side.

4. The computer-implemented method of claim 2, wherein the second sensor includes an imaging sensor used for capturing images of the real-world space.

5. The computer-implemented method of claim 1, wherein the real-world object is a hand, and the gesture is a hand gesture.

6. The computer-implemented method of claim 1 further comprising: responsive to detecting the real-world object in the view of the real-world space displayed by the device and prior to detecting the gesture performed using the real-world object, further altering what is output for display by the device by adding another graphical user interface element displayed by the device.

7. The computer-implemented method of claim 6 further comprising:
responsive to no longer detecting the real-world object within the real-world space visible in the view of the real-world space displayed by the device, further altering what is output for display by the device to remove the graphical user interface element that was added.

8. The computer-implemented method of claim 1, wherein the input corresponding to interaction with the touch-based control of the device is associated with selecting a virtual 3D model to be included in the AR content.

9. The computer-implemented method of claim 1, wherein the AR content includes a virtual 3D model, and the input corresponding to interaction with the touch-based control of the device is associated with modifying at least one of a color, design, or material of the virtual 3D model.

10. A system comprising:
at least one processor; and
a memory storing processor-executable instructions that, when executed, cause the at least one processor to:
receive an input corresponding to interaction with a touch-based control of a device, the input defining an operation related to augmented reality (AR) content that is overlaid onto a view of a real-world space and displayed by the device;
detect a real-world object within the real-world space visible in the view of the real-world space displayed by the device;
responsive to detecting the real-world object within the real-world space visible in the view of the real-world space displayed by the device and prior to detecting a gesture performed using the real-world object, reveal more of the real-world space in the view of the real-world space displayed by the device by altering what is output for display by the device by at least one of reducing, removing, or altering a graphical user interface element that was displayed by the device before the real-world object was detected within the real-world space visible in the view of the real-world space;
subsequent to receiving the input corresponding to the interaction with the touch-based control of the device and subsequent to altering what is output for display by the device responsive to detecting the real-world object, detect the gesture performed using the real-world object within the real-world space visible in the view;
responsive to detecting the gesture, manipulate the AR content; and
responsive to no longer detecting the real-world object within the real-world space visible in the view of the real-world space displayed by the device, further alter what is output for display by the device to restore at least some of the graphical user interface element that was reduced, removed, or altered.

11. The system of claim 10, wherein the touch-based control comprises a first sensor of the device and wherein the device further comprises a second sensor different from the first sensor, the second sensor used for detecting the gesture performed in the real-world space depicted in the view.

12. The system of claim 11, wherein the touch-based control is disposed on a first side of the device and the second sensor is disposed on a second side of the device, the first side opposite the second side.

13. The system of claim 11, wherein the second sensor includes an imaging sensor used for capturing images of the real-world space.

14. The system of claim 10, wherein the real-world object is a hand, and the gesture is a hand gesture.

15. The system of claim 10, wherein the at least one processor is further to: responsive to detecting the real-world object within the real-world space visible in the view of the real-world space displayed by the device and prior to detecting the gesture performed using the real-world object, further alter what is output for display by the device by performing further operations including adding another graphical user interface element displayed by the device.

16. The system of claim 15, wherein the at least one processor is further to:
responsive to no longer detecting the real-world object within the real-world space visible in the view of the real-world space displayed by the device, further alter what is output for display by the device to remove the graphical user interface element that was added.

17. The system of claim 10, wherein the input corresponding to interaction with the touch-based control of the device is associated with selecting a virtual 3D model to be included in the AR content.

18. The system of claim 10, wherein the AR content includes a virtual 3D model, and the input corresponding to interaction with the touch-based control of the device is associated with modifying at least one of a color, design, or material of the virtual 3D model.

19. A non-transitory computer readable medium having stored thereon computer-executable instructions that, when executed by a computer, cause the computer to perform operations comprising:
receiving an input corresponding to interaction with a touch-based control of a device, the input defining an operation related to augmented reality (AR) content that is overlaid onto a view of a real-world space and displayed by the device;
detecting a real-world object within the real-world space visible in the view of the real-world space displayed by the device;
responsive to detecting the real-world object within the real-world space visible in the view of the real-world space displayed by the device and prior to detecting a gesture performed using the real-world object, revealing more of the real-world space in the view of the real-world space displayed by the device by altering what is output for display by the device by at least one of reducing, removing, or altering a graphical user interface element that was overlaid on the view of the real-world space displayed by the device before the real-world object was detected within the real-world space visible in the view of the real-world space;
subsequent to receiving the input corresponding to the interaction with the touch-based control of the device and subsequent to altering what is output for display by the device responsive to detecting the real-world object, detecting the gesture performed using the real-world object within the real-world space visible in the view;
responsive to detecting the gesture, manipulating the AR content; and responsive to no longer detecting the real-world object within the real-world space visible in the view of the real-world space displayed by the device, further altering what is output for display by the device to restore at least some of the graphical user interface element that was reduced, removed, or altered.

20. The non-transitory computer readable medium of claim 19, wherein the input corresponding to interaction with the touch-based control of the device is associated with selecting a virtual 3D model to be included in the AR content.

21. The non-transitory computer readable medium of claim 19, wherein the AR content includes a virtual 3D model, and the input corresponding to interaction with the touch-based control of the device is associated with modifying at least one of a color, design, or material of the virtual 3D model.

* * * * *